United States Patent [19]
Chan

[11] Patent Number: 5,903,861
[45] Date of Patent: May 11, 1999

[54] METHOD FOR SPECIFICALLY CONVERTING NON-PHONETIC CHARACTERS REPRESENTING VOCABULARY IN LANGUAGES INTO SURROGATE WORDS FOR INPUTTING INTO A COMPUTER

[76] Inventor: Kun C. Chan, P.O. Box 22728, San Diego, Calif. 92192-2728

[21] Appl. No.: 08/744,021

[22] Filed: Nov. 5, 1996

Related U.S. Application Data

[60] Provisional application No. 60/008,509, Dec. 12, 1995, and provisional application No. 60/008,646, Dec. 14, 1995.

[51] Int. Cl.⁶ .................................................... G06F 15/38
[52] U.S. Cl. ............................................. 704/9; 707/535
[58] Field of Search ...................... 704/1, 8, 9; 707/530, 707/534, 535; 507/53, 61

[56] References Cited

U.S. PATENT DOCUMENTS

| | | | |
|---|---|---|---|
| 4,602,878 | 7/1986 | Merner et al. | 400/110 |
| 4,698,758 | 10/1987 | Larsen | 704/1 |
| 4,829,583 | 5/1989 | Monroe et al. | 382/185 |
| 4,868,913 | 9/1989 | Tse-Kai | 400/110 |
| 5,109,352 | 4/1992 | O'Dell | 707/542 |
| 5,119,296 | 6/1992 | Zheng et al. | 704/1 |
| 5,131,766 | 7/1992 | Wong | 707/535 |
| 5,137,383 | 8/1992 | Wong | 400/484 |
| 5,175,803 | 12/1992 | Yeh | 707/535 |
| 5,307,267 | 4/1994 | Yang | 704/9 |
| 5,360,343 | 11/1994 | Tang | 704/9 |

*Primary Examiner*—David R. Hudspeth
*Assistant Examiner*—Patrick N. Edouard
*Attorney, Agent, or Firm*—David and Raymond; Raymond Y. Chan

[57] ABSTRACT

A method for specifically converting non-phonetic characters representing vocabulary in languages into surrogate words for inputting into a computer includes the steps of (a) alphabetizing a pictographic/ideographic radical of each character according to its pronunciation in a respective language, with the resulting spelling then being used as a prefix for a newly created surrogate word; (b) alphabetizing a phonetic radical according to its pronunciation in the respective language, with the resulting spelling then being used as a suffix for the newly created surrogate word; and (c) combining the prefix and suffix together and separate them with a separate mark such as a hyphen "-", thus creating the surrogate word for each specific "character" used in the written form of the respective language. Such new created surrogate words are unique for and can precisely represent the non-phonetic characters used in the written oriental languages such as Chinese, Japanese, Korean language, and Indian language, thus facilitating the easy input of the information in these languages into a computer.

112 Claims, 23 Drawing Sheets

Please remember that the markers have no effect in the way the new "words" are pronounced and the first of the two rules: the prefix is silent.

Chart
*Pin yin* alphabets and *zhuyin zimu*

| Serial Number | Pin yin alphabets (Consonants) | Zhuyin Zimu | Serial Number | Pin Yin Alphabets (Vowels) | Zhuyin Zimu |
|---|---|---|---|---|---|
| 1 | B | ㄅ | 22 | Y, YI, I | ㄧ |
| 2 | P | ㄆ | 23 | W, U | ㄨ |
| 3 | M | ㄇ | 24 | U, YU | ㄩ |
| 4 | F | ㄈ | 25 | A | ㄚ |
| 5 | D | ㄉ | 26 | O | ㄛ |
| 6 | T | ㄊ | 27 | E | ㄜ |
| 7 | L | ㄌ | 28 | AI | ㄞ |
| 8 | N | ㄋ | 29 | EI | ㄟ |
| 9 | G | ㄍ | 30 | AO | ㄠ |
| 10 | K | ㄎ | 31 | OU | ㄡ |
| 11 | H | ㄏ | 32 | AN | ㄢ |
| 12 | J | ㄐ | 33 | EN | ㄣ |
| 13 | Q | ㄑ | 34 | ANG | ㄤ |
| 14 | X | ㄒ | 35 | ENG | ㄥ |
| 15 | ZH | ㄓ | 36 | ER | ㄦ |
| 16 | CH | ㄔ | | | |
| 17 | SH | ㄕ | | | |
| 18 | R | ㄖ | | | |
| 19 | Z | ㄗ | | | |
| 20 | C | ㄘ | | | |
| 21 | S | ㄙ | | | |

Compound Vowels

| Serial Number | Pin yin | Zhuyin Zimu | Serial Number | Pin yin | Zhuyin Zimu |
|---|---|---|---|---|---|
| 37 | IA | ㄧㄚ | 48 | WEI, uei | ㄨㄟ |
| 38 | IE | ㄧㄝ | 49 | WAN, uan | ㄨㄢ |
| 39 | IAO | ㄧㄠ | 50 | WEN, uen | ㄨㄣ |
| 40 | IU | ㄧㄡ | 51 | WANG, uang | ㄨㄤ |
| 41 | IAN | ㄧㄢ | 52 | WENG, ong | ㄨㄥ |
| 42 | IN | ㄧㄣ | 53 | YUE | ㄩㄝ |
| 43 | IANG | ㄧㄤ | 54 | YUAN | ㄩㄢ |
| 44 | IONG | ㄩㄥ | 55 | YUEN | ㄩㄣ |
| 45 | WA, ua | ㄨㄚ | | | |
| 46 | WO, uo | ㄨㄛ | | | |
| 47 | WAI, uai | ㄨㄞ | | | |

FIG 1

Chart
*Katakana, hiragana* and their English Equivalent

| Serial No. | Katakana | Hiragana | Eng. Equ. | Serial No. | Katakana | Hiragana | Eng. Equ. |
|---|---|---|---|---|---|---|---|
| 1 | ア | あ | A | 43 | ロ | ろ | RO |
| 2 | イ | い | I | 44 | ワ | わ | WA |
| 3 | ウ | う | U | 45 | ヲ | を | O |
| 4 | エ | え | E | 46 | ン | ん | UN |
| 5 | オ | お | O | 47 | ガ | が | GA |
| 6 | カ | か | KA | 48 | ギ | ぎ | GI |
| 7 | キ | き | KI | 49 | グ | ぐ | GU |
| 8 | ク | く | KU | 50 | ゲ | げ | GE |
| 9 | ケ | け | KE | 51 | ゴ | ご | GO |
| 10 | コ | こ | KO | 52 | ザ | ざ | ZA |
| 11 | サ | さ | SA | 53 | ジ | じ | JI (ZI) |
| 12 | シ | し | SHI | 54 | ズ | ず | ZU |
| 13 | ス | す | SU | 55 | ゼ | ぜ | ZE |
| 14 | セ | せ | SE | 56 | ゾ | ぞ | ZO |
| 15 | ソ | そ | SO | 57 | ダ | だ | DA |
| 16 | タ | た | TA | 58 | ヂ | ぢ | JI (JI) |
| 17 | チ | ち | CHI | 59 | ヅ | づ | ZU |
| 18 | ツ | つ | TSU | 60 | デ | で | DE |
| 19 | テ | て | TE | 61 | ド | ど | DO |
| 20 | ト | と | TO | 62 | バ | ば | BA |
| 21 | ナ | な | NA | 63 | ビ | び | BI |
| 22 | ニ | に | NI | 64 | ブ | ぶ | BU |
| 23 | ヌ | ぬ | NU | 65 | ベ | べ | BE |
| 24 | ネ | ね | NE | 66 | ボ | ぼ | BO |
| 25 | ノ | の | NO | 67 | パ | ぱ | PA |
| 26 | ハ | は | HA | 68 | ピ | ぴ | PI |
| 27 | ヒ | ひ | HI | 69 | プ | ぷ | PU |
| 28 | フ | ふ | HU/FU | 70 | ペ | ぺ | PE |
| 29 | ヘ | へ | HE | 71 | ポ | ぽ | PO |
| 30 | ホ | ほ | HO | | | | |
| 31 | マ | ま | MA | | | | |
| 32 | ミ | み | MI | | | | |
| 33 | ム | む | MU | | | | |
| 34 | メ | め | ME | | | | |
| 35 | モ | も | MO | | | | |
| 36 | ヤ | や | YA | | | | |
| 37 | ユ | ゆ | YU | | | | |
| 38 | ヨ | よ | YO | | | | |
| 39 | ラ | ら | RA | | | | |
| 40 | リ | り | RI | | | | |
| 41 | ル | る | RU | | | | |
| 42 | レ | れ | RE | | | | |

FIG 2

Chart
Hangul and Their English Equivalent

| Consonants | English Equivalent | Vowels | English Equivalent |
|---|---|---|---|
| ㄱ | K | ㅏ | A |
| ㄴ | N | ㅑ | YA |
| ㄷ | D (T) | ㅓ | O |
| ㄹ | R (L) | ㅕ | YO |
| ㅁ | M | ㅗ | O |
| ㅂ | P (B) | ㅛ | YO |
| ㅅ | S | ㅜ | U |
| ㅇ | Ø (NG) | ㅠ | YU |
| ㅈ | CH | ㅡ | U |
| ㅊ | CH' | ㅣ | I |
| ㅋ | K' | ㅐ | AE |
| ㅌ | T' | ㅒ | YAE |
| ㅍ | P' | ㅔ | E |
| ㅎ | H | ㅖ | YE |
| ㄲ | KK-K' | ㅢ | UI |
| ㄸ | TT | ㅟ | WI (UE) |
| ㅃ | PP | ㅚ | WE (OE) |
| ㅆ | SS-T | ㅘ | WA |
| ㅉ | CC | ㅙ | WAE |
| | | ㅝ | WU |
| | | ㅞ | WE |

FIG 3

LIST OF RADICALS

| Serial No. | Radicals in original forms and shapes | Literary Pronunciation | Habitual Pronunciation | Special key(s) for computer input | Optional key(s) for input |
|---|---|---|---|---|---|
| 1 | 一 | yi | heng | y | hg |
| 2 | 丨 | gunm | shuf | shu | gun, zhip |
| 3 | 丶 | zhum | dianm | dia | zhum |
| 4 | 丿 | piem |  | pie |  |
| 5 | 乙 | yim |  | yim |  |
| 6 | 亅 | juep | gou | go | ju |
| 7 | 二 | erf |  | erf | err |
| 8 | 亠 | toup |  | to |  |
| 9 | 人 | ren |  | r |  |
| 10 | 儿 | erp |  | erp | ee |
| 11 | 入 | ruf |  | ru |  |
| 12 | 八 | ba |  | ba |  |
| 13 | 冂 | jiong |  | jio | jg |
| 14 | 冖 | mif |  | mif |  |
| 15 | 冫 | bing |  | bin | bn |
| 16 | 几 | ji |  | ji |  |
| 17 | 凵 | qu | qu | qu |  |
| 18 | 刀 | dao |  | d |  |
| 19 | 力 | lif |  | l |  |
| 20 | 勹 | bao | bo | bao | bo |

FIG 4A

LIST OF RADICALS

| Serial No. | Radicals in original forms | Literary Pronunciation | Habitual pronunciation | Key(s) for computer input | Optional key(s) for input |
|---|---|---|---|---|---|
| 21 | 匕 | bif | | bi ㄅㄧ | |
| 22 | 匚 | fang | | fang ㄈㄤ | fng |
| 23 | 匸 | xif | | xif ㄒㄧㄈ | |
| 24 | 十 | ship | | ship ㄕㄆ | shhhh, shii |
| 25 | 卜 | bum | | bu ㄅㄨ | bu, pu / puu |
| 26 | 卩 | jiep | | jie ㄐㄧㄝ | je ㄐㄝ |
| 27 | 厂 | hanm | changm, he | cha ㄏ | cg, he |
| 28 | 厶 | si | | sii ㄙ | |
| 29 | 又 | youf | | you ㄧㄨ | |
| 30 | 口 | koum | | k ㄎ | |
| 31 | 口 | weip | | w ㄨ | |
| 32 | 土 | tum | | t ㄊ | |
| 33 | 士 | shif | | shif ㄕㄈ | shf |
| 34 | 夂 | zhim | | zhim ㄓㄇ | zii ㄗㄗ |
| 35 | 夊 | sui | | sui ㄙㄨㄟ | |
| 36 | 夕 | xiff | | xiff ㄒㄧㄈㄈ | |
| 37 | 大 | daf | | da ㄉㄚ | |
| 38 | 女 | num | | nu ㄋㄨ | nn ㄋㄋ |
| 39 | 子 | zim | | zi ㄗ | |
| 40 | 宀 | mianp | bao-zi/bao-gai | mi ㄇㄧ, ㄇㄧ | bg, bz ㄅㄍ, ㄅㄗ |
| 41 | 寸 | cunf | | cu ㄘㄨ | |

FIG 4B

LIST OF RADICALS

| Serial No. | Radicals in original form and shape | Literary Pronunciation | Habitual Pronunciation | Special key(s) for computer input | Optional keys for input |
|---|---|---|---|---|---|
| 42 | 小 | xiaom | | xia ㄒㄧㄠ | |
| 43 | 尢 | wang | ang | an 尢 | wn |
| 44 | 尸 | shi | | shi 尸 | |
| 45 | 屮 | chef | | chef 彳ㄜ | 彳ㄜ |
| 46 | 山 | shan | | sha 尸ㄢ | sn |
| 47 | 巛 | chuan | | chua 彳ㄨㄢ | chn |
| 48 | 工 | gong | | gn ㄍㄨㄥ | ㄍㄍㄍㄍ |
| 49 | 己 | jim | | jim ㄐㄧㄇ | |
| 50 | 巾 | jin | | jin ㄐㄧㄣ | jj |
| 51 | 干 | gan | ganf | ga ㄍㄢ | |
| 52 | 幺 | yao | ao | yao ㄧㄠ | ao ㄠ |
| 53 | 广 | yanm | guangm | guan | gg, gwan, ㄧㄢ yn |
| 54 | 廴 | yinm | yanp/tinm | yinm ㄧㄣㄇ | yn |
| 55 | 廾 | gongm | | gon ㄍㄨㄥㄇ | ggg ㄍㄍㄍ |
| 56 | 弋 | yif | | yif 一ㄈ | |
| 57 | 弓 | gongg | | g ㄍㄍ | |
| 58 | 子 | jif | xuep | jif ㄐㄧㄈ | xuep ㄒㄩㄝㄆ |
| 59 | 彡 | shann | | shan 尸ㄢㄢ | snn, Shn |
| 60 | 彳 | chi | shuang ren | chi 彳 | rr/sr |

FIG 4C

LIST OF RADICALS

| Serial No. | Radicals in original forms | Literary pronunciation | Habitual pronunciation | Key(s) for computer input | Optional key(s) for computer input |
|---|---|---|---|---|---|
| 61 | 心 | xin | | x ㄒ | |
| 62 | 戈 | ge | | ge ㄍㄜ | |
| 63 | 户 | huf | | huf ㄏㄨㄈ | huu/hf |
| 64 | 手 | shoum | | sho ㄕㄡ/ㄕㄡ | ss/ a |
| 65 | 支 | zhi | | zh ㄓ ㄓ | |
| 66 | 攴(攵) | pu | | pu ㄆㄨ | FW |
| 67 | 文 | wenp | | we ㄨㄣ | ww ㄨㄨ |
| 68 | 斗 | doum | douf | doum ㄉㄡㄇ | dm ㄉㄇ |
| 69 | 斤 | jinn | | jinn ㄐㄧㄣㄣ | jnn, jjj ㄐㄐㄐ |
| 70 | 方 | fangg | | fan ㄈㄤ | fg |
| 71 | 无 | wup | | wu ㄨㄨ | |
| 72 | 日 | rif | | ri ㄖㄖ | rrr |
| 73 | 曰 | yuef | | yuef ㄩㄝㄈ | |
| 74 | 月 | yueff | | yue ㄩㄝ | |
| 75 | 木 | muf | | m ㄇ | |
| 76 | 欠 | qianf | | qia ㄑㄧㄢ | ㄑㄢ |
| 77 | 止 | zhimm | | zz ㄓㄇㄇ | |
| 78 | 歹 | daim | | dai ㄉㄞ | dd ㄉㄉ |
| 79 | 殳 | shuff | yif | yif ㄕㄨㄈ | su/ yf |

FIG 4D

LIST OF RADICALS

| Serial No. | Radicals in original forms | Literary pronunciation | Habitual pronunciation | Key(s) for computer input | Optional key(s) for computer input |
|---|---|---|---|---|---|
| 80 | 毋(母) | wum | mum | wum ㄒㄇ | wuu ㄇㄨ |
| 81 | 比 | bimm | | bii ㄅ一ㄇ | |
| 82 | 毛 | maop | | maop ㄇㄠㄆ | mo |
| 83 | 氏 | shiff | | shiff ㄕㄈㄈ | shff |
| 84 | 气 | qif | | qi ㄑ一 | |
| 85 | 水 | shuim | | s ㄕㄟ | ㄕㄟ |
| 86 | 火 | huom | | h ㄏㄛ | |
| 87 | 爪 | | zhaom | zha ㄓㄠ | zm |
| 88 | 父 | fuf | | fu ㄈㄨ | ff ㄈㄈ |
| 89 | 爻 | yaop | aop | aop/ ao 一ㄠ | yop, yp |
| 90 | 爿 | qiangp | | qian ㄑ一ㄤ | qg ㄑㄤ |
| 91 | 片 | pianf | | pia ㄆ一ㄢ | pn ㄆㄢ |
| 92 | 牙 | yap | | yap | yaa |
| 93 | 牛 | niup | | ni ㄋ一 | ㄋㄨ |
| 94 | 犬 | quanm | | q ㄑ | |
| 95 | 玄 | xuanp | | xua ㄒㄨㄢ | xp |
| 96 | 玉 | yuf | | yu ㄩㄈ | |
| 97 | 瓜 | gua | gwa | gua ㄍㄨㄚ | gwa ㄍㄨㄚ |
| 98 | 瓦 | wam | | wa ㄨㄚ | |
| 99 | 甘 | gann | | gan ㄍㄢㄢ | |

FIG 4E

LIST OF RADICALS

| Serial No. | Radicals In Original Forms and Shapes | Literary Pronunciation | Habitual Pronunciation | Special Key(s) for Computer Input | Optional Keys for Input |
|---|---|---|---|---|---|
| 100 | 生 | sheng | | she ㄕㄥ | sg |
| 101 | 用 | yongf | | yo ㄩㄥ | |
| 102 | 田 | tianp | | tia ㄊ一ㄢ | tn ㄊㄢ, ㄊㄞ, ㄊㄜ |
| 103 | 疋 | pip | | pi ㄆ一 | pp |
| 104 | 疒 | chuangf | bingf | b ㄅ | chu ㄔㄨ |
| 105 | 癶 | boo | guif/ gweif | boo ㄅㄛ | gf ㄍㄨㄟ fa guei ㄍㄨㄟ |
| 106 | 白 | baip | | bai ㄅㄞ | |
| 107 | 皮 | pipp | | p ㄆ | |
| 108 | 皿 | minm | | min ㄇ一ㄣ | mmm |
| 109 | 目 | muff | | mu ㄇㄨ | mm |
| 110 | 矛 | maopp | | maopp ㄇㄠㄆ | mp/ moo/ mou |
| 111 | 矢 | shim | | shim ㄕㄇ | shm |
| 112 | 石 | shipp | | shipp ㄕㄆ | sp |
| 113 | 示 | shifff | qip | sh ㄕㄈ | sf |
| 114 | 肉 | roup | | rou ㄖㄡ | |
| 115 | 禾 | hep | | hep ㄏㄜ | hp, hh ㄏ |
| 116 | 穴 | xuef | | xu ㄒㄩㄝ | xx ㄒㄝ |
| 117 | 立 | liff | | ll ㄌㄌ | lii, lf |
| 118 | 竹 | | zhup | z ㄓㄨ | |
| 119 | 米 | mim | | mii | mmmm |

FIG 4F

LIST OF RADICALS

| Serial No. | Radicals in original forms | Literary pronunciat | Habitual pronunciation | key(s) for computer input | Optional key(s) for computer input |
|---|---|---|---|---|---|
| 120 | 糸 | xifff | si | xi ㄒㄧㄈㄈ | si, sss ㄙㄙ |
| 121 | 缶 | foum | | fo ㄈㄨ | |
| 122 | 网 | wangm | | wan ㄨㄤ | wm/ wg |
| 123 | 羊 | yangp | | yg 一ㄤ | YAN |
| 124 | 羽 | yum | | yum ㄩㄇ | |
| 125 | 老 | laom | | la ㄌㄠ | |
| 126 | 而 | erpp | | eee ㄦㄦㄦ | erpp ㄦㄦㄦ |
| 127 | 耒 | leim | laip | le ㄌㄟ | lai |
| 128 | 耳 | erm | | e ㄦ | ㄦㄇ |
| 129 | 聿 | yuff | lyuf | ly ㄩㄈㄈ, ㄌㄩ | yuuu/yuff |
| 130 | 肉 | rouf | | ro ㄖㄡ | rrr 月月月 |
| 131 | 臣 | chenp | | chen ㄔㄣ | cp |
| 132 | 自 | zif | | zif ㄗㄈ | zf |
| 133 | 至 | zhif | | zhif ㄓㄈ | zzz |
| 134 | 臼 | jiuf | | jiu ㄐㄧㄡ | jf ㄐㄡ |
| 135 | 舌 | shep | | shep ㄕㄜ | shee |
| 136 | 舛 | chuanm | | chuan ㄔㄨㄢ | ㄔㄢ, ㄔㄇ |
| 137 | 舟 | zhou | | zho ㄓㄡ | |
| 138 | 艮 | genf | | gen ㄍㄣ | |
| 139 | 色 | sef | | se ㄙㄜ | |

FIG 4G

LIST OF RADICALS

| Serial No. | Radicals In Original Form and Shapes | Literary Pronunciation | Habitual Pronunciation | Special Key(s) for Computer Input | Optional Key(s) for Input |
|---|---|---|---|---|---|
| 140 | 艸(艹) | caom | | c ㄘ | |
| 141 | 虍 | hup | fup | hu ㄏㄨ | fff/fuu |
| 142 | 虫 | chongp | | ch ㄔㄨㄥ | cc/ v ㄔㄥ |
| 143 | 血 | xuem | | xue ㄒㄩㄝ | xuu ㄒㄝ |
| 144 | 行 | xiongp | hang | xio ㄒㄥ | han, xg |
| 145 | 衣 | yii | | yi ㄧ | yy |
| 146 | 西 | xi | | xii ㄒㄧ | |
| 147 | 見 | jianf | gin | jian ㄐㄧㄢ | ㄐㄢ |
| 148 | 角 | jiao | | jiao ㄐㄧㄠ | jo ㄐㄠ |
| 149 | 言 | yanp | | ya ㄧㄢ | |
| 150 | 谷 | gum | | gu ㄍㄨ | gw |
| 151 | 豆 | douf | | do ㄉㄡ | ㄉㄡ |
| 152 | 豕 | shimm | | shimm ㄕㄇ | |
| 153 | 豸 | zhiff | baof/ mao | mao ㄇㄠ, ㄇㄛ | zhiff ㄓㄛ |
| 154 | 貝 | beif | | be ㄅㄟ | bb ㄅㄟ |
| 155 | 赤 | chif | | chif ㄔ | chf |
| 156 | 走 | zoum | zum | zo ㄗㄡ | zum |
| 157 | 足 | zup | | zu ㄗㄨ | |
| 158 | 身 | shengg | | shen ㄕㄥ | shn, sgg |
| 159 | 車 | che | | che ㄔㄜ | u ㄔㄜ |

FIG 4H

LIST OF RADICALS

| Serial No. | Radicals in original forms | Literary pronunciation | Habitual pronunciation | Key(s) for computer input | Optional key(s) for computer input |
|---|---|---|---|---|---|
| 160 | 辛 | xinn | | xin ㄒㄧㄣ | xn ㄒㄣ |
| 161 | 辰 | chenpp | | cn ㄔㄣˋ | |
| 162 | 辵(辶) | chuof | 走辶ㄗㄏ | cho ㄔㄨㄛ | zou/o ㄗㄡㄏ |
| 163 | 邑(左阝) | yiii | | yii − − − | yyy |
| 164 | 酉 | youm | | you ㄧㄡ | ym ˉㄧㄡ |
| 165 | 采 | caim | | ca ㄘㄞ | ci |
| 166 | 里 | lim | | lll ㄌㄌㄌ | ㄌ, LM |
| 167 | 金 | jinnn | | j ㄐ | |
| 168 | 長 | changp | | chp ㄔㄤ | chan |
| 169 | 門 | menp | | mn ㄇㄣ | ㄇㄇㄇ |
| 170 | 阜(右阝) | fuff | | f ㄈ | ㄦㄎ |
| 171 | 隶 | daif | | daif ㄉㄞㄈ | di |
| 172 | 隹 | jia | | jia ㄐㄧㄚ | ja ㄐㄧㄚ ㄓㄨ |
| 173 | 雨 | yumm | | yumm ㄩㄇㄇ | ymm |
| 174 | 青 | qing | | qing ㄑㄧㄥ | qn ㄑㄥ |
| 175 | 非 | fei | | fe ㄈㄟ | |
| 176 | 面 | mianf | | mian ㄇㄧㄢ | mf ㄇㄈ |
| 177 | 革 | gep | | gep ㄍㄜ | gp ㄍㄜㄆ |
| 178 | 韋 | weim | | wei ㄨㄟ | wi |
| 179 | 韭 | jium | | jium ㄐㄧㄡ | jm ㄐㄡ |

FIG 4I

LIST OF RADICALS

| Serial no. | Radicals in original forms | literary pronunciation | Habitual pronunciation | Key(s) for computer input | Optional key(s) for input |
|---|---|---|---|---|---|
| 180 | 音 | yin | | yin ー丂 | |
| 181 | 頁 | yef | | ye ー世 | |
| 182 | 風 | feng | | fen 匚ㄥ | fn |
| 183 | 飛 | feii | | feii 匚乁乁 | fi |
| 184 | 食 | shippp | | shp 尸ㄨㄨ | shhh |
| 185 | 首 | shoumm | | shou 尸ㄨㄨ | su 尸ㄨㄇ |
| 186 | 香 | xiang | | xian ㄒㄧㄤ | xg ㄒㄤ |
| 187 | 馬 | mam | | ma ㄇㄚ | |
| 188 | 胃 | gumm | | gum ㄍㄨㄇ | gwm/gm |
| 189 | 高 | gao | | gao ㄍㄠ | |
| 190 | 髟 | biao | | bia ㄅㄧㄠ | |
| 191 | 鬥 | douff | | douf ㄉㄨ匚匚 | df ㄉ匚, ㄉㄉ |
| 192 | 鬯 | changf | | chf 彳ㄤ匚 | cf 彳ㄤ |
| 193 | 鬲 | lifff | | llll ㄌㄌㄌㄌ | lf ㄌ匚匚 |
| 194 | 鬼 | guim | | guip ㄍㄨㄟ | gweip/gp ㄍㄟ |
| 195 | 魚 | yup | | yp ㄩㄨ | |
| 196 | 鳥 | niaom | | n ㄋ | |
| 197 | 鹵 | lum | lwm | lum ㄌㄨㄇ | lm |
| 198 | 鹿 | luf | lwf | lu ㄌㄨ | lw ㄌ匚 |
| 199 | 麥 | maif | | mai ㄇ ㄞ | |

FIG 4J

LIST OF RADICALS

| Serial No. | Radicals In Original Forms and Shapes | Literary Pronunciation | Habitual Pronunciation | Special Key(s) for Computer Input | Optional Key(s) for Input |
|---|---|---|---|---|---|
| 200 | 麻 | map | | map ㄇㄚㄆ | maa ㄇㄚ |
| 201 | 黃 | huangp | | hua ㄏㄨㄤ | hwa/ hg ㄏㄤ |
| 202 | 黍 | shum | | shum ㄕㄨㄇ | sm ㄕㄨ |
| 203 | 黑 | hei | | hei ㄏㄟ | |
| 204 | 黹 | zhimmm | | zhimm ㄓㄇㄇ | zhmm |
| 205 | 黽 | minmm | | minm ㄇㄧㄇ | ㄇㄧㄣ |
| 206 | 鼎 | dingm | | ding ㄉㄧㄥ | dg ㄉㄥ |
| 207 | 鼓 | gummm | | gumm ㄍㄨㄇㄇ | gwmm, gm ㄍㄇㄇ |
| 208 | 鼠 | shumm | | shumm ㄕㄨㄇㄇ | shuu ㄕㄨ |
| 209 | 鼻 | bip | | bip ㄅㄧㄆ | bp ㄅㄆ |
| 210 | 齊 | qip | | qip ㄑㄧ | qp ㄑㄆ |
| 211 | 齒 | chim | | chim ㄔㄇ | chm |
| 212 | 龍 | long | | lo ㄌㄨㄥ | lg |
| 213 | 龜 | gui | | gui ㄍㄨㄟㄟ | gwei, gi ㄍㄟㄟ |
| 214 | 龠 | yuefff | | yueff ㄩㄝㄈㄈ | yf |

FIG 4K

List Of Chinese Characters Pronounced As "Ji" But Differentiated By Adding To Them Silent Pictographic Radicals To The Left Of Hyphen. These Radicals Expressed By Alphabets Are Referred To As Prefixes.

| 隋 fu-ji | 晨 shi-ji | 鍂 jin-ji |
|---|---|---|
| 疾 chuang-ji /bing-ji | 伋 ren-ji | 猎 quan-ji |
| 岌 shan-ji | 藉 cao-ji | 脊 rou-ji |
| 擊 shou-ji | 集 jia-ji | 寂 mian-ji |
| 即 zi-ji | 嫉 nyu-ji | 機 mu-ji |
| 鞿 ge-ji | 急 xin-ji | 輯 che-ji |
| 鱉 niao-ji | 瞁 muf-ji | 鯚 yup-ji |
| 齏 qi-ji | 霽 yum-ji | 襉 shif-ji |
| 穀 shu-ji | 劑 dao-ji | 虮 chung-ji |
| 幾 ge-ji | 奇 da-ji | 羈 wang-ji |
| 磯 ship-ji | 璣 yuf-ji | 犄 niu-ji |
| 曁 bai-ji | 髻 biao-ji | 覬 jian-ji |
| 乩 yi-ji | 譏 yan-ji | 嘰 kou-ji |
| 汲 bi-ji | 跡 zu-ji | 箕 zhu-ji |
| 激 shui-ji | 勣 li-ji | 基 tu-ji |
| 績 xi-ji | 積 he-ji | 旣 wu-ji |
| 觭 jiao-ji | 庋 yanm-ji | 驥 ma-ji |
| 吉 shif-ji | 耤 lei-ji | 鱭 gui-ji |
| 殛 dai-ji | 墼 shu-ji | 尖 xiao-ji |
| 覉 lu-ji | 己 ji | |
| 襋 yy-ji | | |

FIG 5

Chart
Illustration of the five steps used to convert the characters into English-style alphabets

| Process/description | Changes the characters used by the Chinese go through with the five steps of conversion process | | | |
|---|---|---|---|---|
| The original, whole characters having the same pronunciation | 試 Pronounced *shi* in *pin yin* | 誓 Pronounced *shi* in *pin yin* | 言是 Pronounced *shi* in *pin yin* | 識 Pronounced *shi* in *pin yin* |
| Divide into two radicals | 言 Pictographic radical / 式 Phonetic radical | 言 Pictographic radical / 折 Phonetic radical | 言 Pictographic radical / 是 Phonetic radical | 言 Pictographic radical / 識 Phonetic radical |
| Phoneticalize both radicals (steps one and two) | *yan* (prefix) / *shi* (suffix) | *yan* (prefix) / *shi* (suffix) | *yan* (prefix) / *shi* (suffix) | *yan* (prefix) / *shi* (suffix) |
| Add the indicators of intonation (step three) to each radical (prefix and suffix) | *yan shif* — The prefix is unique. Intonation indicator is not needed for the prefix. All the four characters are pronounced in the fourth intonation, an *f* is added to the end of the suffixes. | *yan shif* | *yan shif* | *yan shif* |
| Put the prefix and the suffix together (step four) | *yan-shif* — The spelling for all four characters are exactly the same. Without adding a "marker," it is impossible to differentiate one from the others. | *yan-shif* | *yan-shif* | *yan-shif* |
| Add markers to the prefix and the suffix (step five) | *yan-shif* — No marker is needed for unique prefix. Since this character is the first of the four to appear in the dictionary, it does not require a marker. | *yan-shiff* — No marker is needed for the unique prefix. Since this character appears secondly in the dictionary, the last letter is repeated once as a marker. | *yan-shifff* — No marker is needed for the unique prefix. Since this character is the third one to appear in the dictionary, the last letter is repeated twice as markers. | *yan-shiffff* — No marker is needed for the unique prefix. Since the character appears fourthly in the dictionary, the last letter is repeated thrice as markers. |
| The final product: unique, new "word" for each character | *yan-shif* | *yan-shiff* | *yan-shifff* | *yan-shiffff* |
| Spellings made of *zhuyin zimu* | ㄧㄢ-ㄕ | ㄧㄢ-ㄕㄈㄈ | ㄧㄢ-ㄕㄈㄈㄈ | ㄧㄢ-ㄕㄈㄈㄈㄈ |

Please remember that the markers have no effect in the way the new "words" are pronounced and the first of the two rules: the prefix is silent.

FIG 6

Chart

Process/ descrption Changes the characters used by the Japanese go through with the five steps of conversion process

| | | | | |
|---|---|---|---|---|
| The original, whole characters having the same pronunciation | 杠 Pronounced *ko* in Japnese | 杞 Pronounced *ko* in Japanese | 杭 Pronounced *ko* in Japanese | 枯 Pronounced *ko* in Japanese |
| Divide into two radicals | 木 Pictographic radica / 工 Phonetic radical | 木 Pictographic radical / 己 Phonetic radical | 木 Pictographic radical / 亢 Phonetic radical | 木 Pictographic radical / 古 Phonetic radical |
| Phoneticalize both raidcals (steps one and two) | *ki* (prefix) / *ko* (suffix) | *ki* (prefix) / *ko* (suffix) | *ki* (prefix) / *ko* (suffix) | *ki* (prefix) / *ko* (suffix) |
| Add the indicators of intonation (step three) to each radical | This step is not applicable to Japanese language | | | |
| Put the prefix and the suffix together (step four) | *ki-ko* The spelling for all four characters are exactly the same. Without a "marker," it is impossible to differentiate one form the others. | *ki-ko* | *ki-ko* | *ki-ko* |
| Add markers to the prefix and the suffix (step five) | *ki-ko* The prefix is unique hence no marker is needed for it and since this character is the first of the four to appear in the dictionary, it does not require a marker. | *ki-koo* No marker is needed for the unique prefix. Since this character appears secondly in the dictionary, the last letter is repeated once as a maker. | *ki-kooo* No marker is needed for the unique prefix. Since this character is the third one to appear in the dictionary, the last letter is repeated twice as markers. | *ki-koooo* No marker is needed for the unique prefix. Since the character appears fourthly in the dictionary, the last letter is repeated thrice as markers. |
| The final product: a unique, new "word" for each character | *ki-ko* | *ki-koo* | *ki-kooo* | *ki-koooo* |
| Spellings in *katakana* | キコ | キココ | キココロ | キココココ |
| Spellings in *hiragana* | きこ | きここ | きこここ | きこここここ |

Please remember that the markers have no effect on the way the new "words" are pronounced and the first of the two rules: the prefix is silent

FIG 7

Chart
Illustration of the five steps used to convert the characters into English-style alphabets

| Process/ description | Changes the characters used by the Koreans go through with the five steps of conversion process | | | |
|---|---|---|---|---|
| The original, whole characters having the same pronunciation | 杞 Pronounced *ki* in Korean | 枝 Pronounced *ki* in Korean | 棋 Pronounced *ki* in Korean | 機 Pronounced *ki* in Korean |
| Divide into two radicals | 木 己 Pictographic Phonetic radical radical | 木 支 Pictographic Phonetic radical radical | 木 其 Pictographic Phonetic radical radical | 木 幾 Pictographic Phonetic radical radical |
| Phoneticalize both raidcals (steps one and two) | *muk* (prefix) *ki* (suffix) There are 2 ways to spell the prefix. One is to spell it according to the pronunciation of a native Korean vocabulary. The other | *muk* (prefix) *ki* (suffix) way is to spell it accord-ing to the Korean pro-nunciation of the Chinese character. Since the patent concerns Chinese | *muk* (prefix) *ki* (suffix) characters, the writer chooses the latter way of spelling. The same choice is made with hangul spelling. This is not to say that it should | *muk* (prefix) *ki* (suffix) not be done with the former way of spelling the vocabulary. It all depends on what the Koreans feel comfort-able with. |
| Add the indicators of intonation (step three) to each radical (prefix and suffix) | This step is not applicable to Korean language | | | |
| Put the prefix and the suffix together (step four) | *muk-ki* The spelling for all four characters are exactly the same. Without adding a "marker," it is impossible to differentiate one form the others. | *muk-kii* | *muk-kiii* | *muk-kiiii* |
| Add markers to the prefix and the suffix (step five) | *muk-ki* No marker is needed for the unique prefix. Since this character is the first of the four to appear in the dictionary, it does not require a marker. | *muk-kii* No marker is needed for the unique prefix. Since this character appears secondly in the dictionary, the last letter is repeated once as a maker. | *muk-kiii* No marker is needed for the unique prefix. Since this character is the third one to appear in the dictionary, the last letter is repeated twice as markers. | *muk-kiiii* No marker is needed for the unique prefix. Since the character appears fourthly in the dictionary, the last letter is repeated thrice as markers. |
| The final product: a unique, new "word" for each character | *muk-ki* | *muk-kii* | *muk-kiii* | *muk-kiiii* |
| Spellings in *hangul* | 무기 | 무기I | 무기II | 무기III |
| Spellings in hangul | ㅁㅗ〤ㅣ | ㅁㅗ〤ㅣI | ㅁㅗ〤ㅣII | ㅁㅗ〤ㅣIII |

Please remember that the markers have no effect on the way the new "words" are pronounced and first of the two rules: the prefix is silent.

FIG 8

Chart
Changes made to the alphabets used in the *pin yin* system

| Serial Number Of The Alphabet | Original Form In The *Pin Yin* System | Form In *Zhu Yin* | New Form |
|---|---|---|---|
| 22 | I or Yi | l | Y |
| 24 | U or Yu | Ц | Yu |

FIG 9

Chart Showing The Process During which A Unique Set of Codes for Phraese in Chinese Characters Used By The Chinese Are Created

| Row No. | Column No.1 | Column No. 2 | Column No. 3 | Column No. 4 | Column No. 5 | Column No. 6 |
|---|---|---|---|---|---|---|
| 1 | Phrases in Chiese Chrarcters | Spelling in *Pinyin* System | Acronyms according to *Pinyin* System | Spelling according to the process Discussed in Provisioal Patent Application No. | Add Labels/ markers to the Acronym-s in column 3 | New, Unique Set of Codes for the phrases |
| 2 | 幻化 | huan hua | HH | aop-huanf r-huaf | ar | HHar |
| 3 | 火花 | huo hua | HH | h-huom c-hua | hc | HHhc |
| 4 | 火化 | huo hua | HH | h-huom-huaf | hh | HHhh |
| 5 | 花卉 | hua hui | HH | c-hua ship-huif | cs | HHcs |
| 6 | 謊話 | huang hua | HH | c-huangm yanp-huaf | cy | HHcy |
| 7 | 劃畫 | hua hua | HH | d-huaf tian-huaf | dt | HHdt |
| 8 | 黑河 | hei he | HH | h-hei s-he | hs | HHhs |
| 9 | 黑話 | hei hua | HH | h-hei yanp-huaf | hy | HHhy |
| 10 | 歡呼 | huan hu | HH | qian-huan k-hu | qk | HHqk |
| 11 | 呼喊 | hu han | HH | k-hu k-hanm | kk | HHkk |
| 12 | 呼號 | hu hau | HH | k-hu k-haup | kk*k* | HHkk*k* |
| 13 | 呼喝 | hu he | HH | k-hu k-he | kk*kk* | HHkk*kk* |
| 14 | 嘿嘿 | hei hei | HH | k-hei k-hei | kk*kkk* | HHkk*kkk* |
| 15 | 回火 | hui huo | HH | wei-huip h-huom | wh | HHwh |
| 16 | 呼喚 | hu huan | HH | k-hu k-huanf | kku | HHkku |
| 17 | 好好 | hau hau | HH | nyu-haum nyu-haum | nn | HHnn |
| 18 | 棄邪歸正 | qi xie gui zheng | QXGZ | m-qif yyy-xiep zhif-gui zhif-zhengf | | QXGZ |
| 19 | 奇形怪狀 | qi xing guai zhuang | QXGZ | daf-qi shann-xing x-guif qiang-zhuangf | *z* | QXGZ*z* |
| 20 | 欺君罔上 | qi jun wang shang | QJWS | qianf-qi k-jun wang-wang y-shangf | | QJWS |
| 21 | 起居無時 | qi jyu wu shi | QJWS | zu-qim shi-jyu h-wu ri-ship | *s* | QJWS*s* |

Note: The dark, italic letters in clumns 5 and 6 are repeatedly typed as markers.

FIG 10

Chart Showing The Process Through Which A Unique Set Of Codes For Phrases In Chinese Characters Used By The Chinese Is Achieved

| Row No. | Column No.1 | Column No. 2 | Column No. 3 | Column No. 4 | Column No. 5 | Column No. 6 |
|---|---|---|---|---|---|---|
| 1 | Phrases in Chiese Chrracters | Spelling in *zhuyin* System | Acronyms according to *zhuyin* System | Spelling according to the Process Discussed in Provisional Patent Application No. | Add Labels/ markers to the Acronym-s in column 3 | New, Unique Set of Codes for the phrases |
| 2 | 幻化 | ㄏㄨㄢ ㄏㄨㄚ | ㄏ ㄏ | ㄠ*ㄏㄨㄢ ㄇㄣ*ㄏㄨㄚ | ㄠ ㄇ | ㄏ ㄏ ㄠ ㄇ |
| 3 | 火花 | ㄏㄨㄛ ㄏㄨㄚ | ㄏ ㄏ | ㄏ*ㄏㄨㄛ ㄎ*ㄏㄨㄚ | ㄏ ㄎ | ㄏ ㄏ ㄏ ㄎ |
| 4 | 火化 | ㄏㄨㄛ ㄏㄨㄚ | ㄏ ㄏ | ㄏ*ㄏㄨㄛ ㄇㄣ*ㄏㄨㄚ | ㄏ ㄇ | ㄏ ㄏ ㄏ ㄇ |
| 5 | 花卉 | ㄏㄨㄚ ㄏㄨㄟ | ㄏ ㄏ | ㄎ*ㄏㄨㄚ ㄕㄠ*ㄏㄨㄟ | ㄎ ㄕ | ㄏ ㄏ ㄎ ㄕ |
| 6 | 謊話 | ㄏㄨㄤ ㄏㄨㄚ | ㄏ ㄏ | ㄧㄢ*ㄏㄨㄤ<br>ㄧㄢ*ㄏㄨㄚ | ㄧ ㄧ | ㄏ ㄏ ㄧ ㄧ |
| 7 | 劃畫 | ㄏㄨㄚ ㄏㄨㄚ | ㄏ ㄏ | ㄉ*ㄏㄨㄚ ㄊ*ㄏㄨㄚ | ㄉ ㄊ | ㄏ ㄏ ㄉ ㄊ |
| 8 | 黑河 | ㄏㄟ ㄏㄜ | ㄏ ㄏ | ㄏ*ㄏㄟ ㄕㄟ*ㄏㄜ | ㄏ ㄕ | ㄏ ㄏ ㄏ ㄕ |
| 9 | 黑話 | ㄏㄟ ㄏㄨㄚ | ㄏ ㄏ | ㄏ*ㄏㄟ ㄧㄢ*ㄏㄨㄚ | ㄏ ㄧ | ㄏ ㄏ ㄏ ㄧ |
| 10 | 歡呼 | ㄏㄨㄢ ㄏㄨ | ㄏ ㄏ | ㄧㄢ*ㄏㄨㄢ ㄎ*ㄏㄨ | ㄧ ㄎ | ㄏ ㄏ ㄧ ㄎ |
| 11 | 呼喊 | ㄏㄨ ㄏㄢ | ㄏ ㄏ | ㄎ*ㄏㄨ ㄎ*ㄏㄢ | ㄎ ㄎ | ㄏ ㄏ ㄎ ㄎ |
| 12 | 呼嚎 | ㄏㄨ ㄏㄠ | ㄏ ㄏ | ㄎ*ㄏㄨ ㄎ*ㄏㄠ | ㄎ ㄎ | ㄏ ㄏ<br>ㄎ ㄎ ㄎ |
| 13 | 呼喝 | ㄏㄨ ㄏㄜ | ㄏ ㄏ | ㄎ*ㄏㄨ ㄎ*ㄏㄜ | ㄎ ㄎ | ㄏ ㄏ<br>ㄎ ㄎ ㄎ ㄎ |
| 14 | 嘿嘿 | ㄏㄟ ㄏㄟ | ㄏ ㄏ | ㄎ*ㄏㄟ ㄎ*ㄏㄟ | ㄎ ㄎ | ㄏ ㄏ ㄎ<br>ㄎ ㄎ ㄎ ㄎ |
| 15 | 回火 | ㄏㄨㄟ ㄏㄨㄛ | ㄏ ㄏ | ㄨ*ㄏㄨㄟ ㄏ*ㄏㄨㄛ | ㄨ ㄏ | ㄏ ㄏ ㄨ ㄏ |
| 16 | 呼喚 | ㄏㄨ ㄏㄨㄢ | ㄏ ㄏ | ㄎ*ㄏㄨ ㄎ*ㄏㄨㄢ | ㄎ ㄎ | ㄏ ㄏ ㄎ ㄎ ㄎ<br>ㄎ ㄎ ㄎ |
| 17 | 好好 | ㄏㄠ ㄏㄠ | ㄏ ㄏ | ㄋ*ㄏㄠ ㄋ*ㄏㄠ | ㄋ ㄋ | ㄏ ㄏ ㄋ ㄋ |
| 18 | 棄邪歸正 | ㄑ ㄧㄒㄧㄝ<br>ㄍㄨㄟ ㄓㄥ | ㄑ ㄒ ㄍ ㄓ | Omitted as it is not necessary | n/n | ㄑ ㄒ ㄍ ㄓ |
| 19 | 奇形怪狀 | ㄑ ㄧㄒㄧㄥ<br>ㄍㄨㄞ ㄓㄨㄤ | ㄑ ㄒ ㄍ ㄓ | Omitted as it is not necessary | ㄓ | ㄑ ㄒ ㄍ ㄓ ㄓ |
| 20 | 欺君罔上 | ㄑ ㄧㄐㄩㄣ<br>ㄨㄤ ㄕㄤ | ㄑ ㄐ ㄨ ㄕ | Omitted as it is not necessary | n/n | ㄑ ㄐ ㄨ ㄕ |
| 21 | 起居無時 | ㄑ ㄧㄐㄩ<br>ㄨ ㄕ | ㄑ ㄐ ㄨ ㄕ | Omitted as it is not necessary | ㄕ | ㄑ ㄐ ㄨ ㄕ ㄕ |

FIG 11

Chart Showing The Process Through Which A Unique Set of Codes For A Phraese in Chinese Characters Used By The Japanese Is Created

| Row No. | Column No.1 | Column No. 2 | Column No. 3 | Column No. 4 | Column No. 5 | Column No. 6 |
|---|---|---|---|---|---|---|
| 1 | Phrases in Chiese Chrarcters and spelling in Kana | Spelling in Latin alphabets, *Hiragana* and *Katakana* | Acronyms according to various ways of spelling | Spelling according to the Process Discussed in Provisional Patent Application No. | Add Labels/ markers to the Acronym-s in column 3 | New, Unique Set of Codes for the phrases |
| 2 | 四 角 | shi kaku | SK | koku-shi tsuno-kaku | kt | SKkt |
|  | Hiragan |  |  |  |  |  |
|  | Katakana |  |  |  |  |  |
| 3 | 死 角 | shi kaku | SK | ichi-ta-shi tsuno-kaku | it | SKit |
|  | Hiragana |  |  |  |  |  |
|  | Katakana |  |  |  |  |  |
| 4 | 資 格 | shi kaku | SK | kai-shi ki-kaku | kk | SKkk |
|  | Hiragana |  |  |  |  |  |
|  | Katakana |  |  |  |  |  |
| 5 | 生 涯 | sho gai | SG | sei-sho sui-gai | ss | SGss |
|  | Hiragana |  |  |  |  |  |
|  | Katakana |  |  |  |  |  |
| 6 | 傷 害 | sho gai | SG | shin-sho ben-gai | sb | SGsb |
|  | Hiragana |  |  |  |  |  |
|  | Katakana |  |  |  |  |  |
| 7 | 障 害 | sho gai | SG | fu-sho ben-gai | fb | SGfb |
|  | Hiragana |  |  |  |  |  |
|  | Katakana |  |  |  |  |  |

Note: The dark, italic letters in clumns 5 and 6 are repeatedly typed as markers.

FIG 12

Chart Showing The Process Through Which A Unique Set of Codes For A Phraese in Chinese Characters Used By The Koreans Is Created

| Row No. | Column No.1 | Column No. 2 | Column No. 3 | Column No. 4 | Column No. 5 | Column No. 6 |
|---|---|---|---|---|---|---|
| 1 | Phrases in Chiese Chrarcters | Spelling in *Hangul* and Latin System | Acronyms according to *Pinyin* System | Spelling according to the Process Discussed in Provisional Patent Application No. | Add Labels/ markers to the Acronyms in column 3 | New, Unique Set of Codes for the phrases |
| 2 | 神氣 Latin | sin ki | SK | si-sin ki-ki | sk | SKs*k* |
|   | Hangul | 신 기 | ㅅㄱ | 시*신 기*기 | ㅅㄱ | ㅅㄱㅅㄱ |
| 3 | 神奇 Latin | sin ki | SK | si-sin dae-ki | sd | SKs*d* |
|   | Hangul | 신 기 | ㅅㄱ | 시*신 대*기 | ㅅㄷ | ㅅㄱㅅㄷ |
| 4 | 神技 Latin | sin ki | SK | si-sin su-ki | ss | SKs*s* |
|   | Hangul | 신 기 | ㅅㄱ | 시*신 수*기 | ㅅㅅ | ㅅㄱㅅㅅ |
| 5 | 神祇 Latin | sin ki | SK | si-sin si-ki | ss*s* | SKss*s* |
|   | Hangul | 신 기 | ㅅㄱ | 시*신 시*기 | ㅅㅅㅅ | ㅅㄱㅅㅅㅅ |
| 6 | 神機 Latin | sin ki | SK | si-sin mok-ki | sm | SKs*m* |
|   | Hangul | 신 기 | ㅅㄱ | 시*신 목*기 | ㅅㅁ | ㅅㄱㅅㅁ |
| 7 | 新奇 Latin | sin ki | SK | kin-sin dae-ki | kd | SKk*d* |
|   | Hangul | 신 기 | ㅅㄱ | 근*신 대*기 | ㄱㄷ | ㅅㄱㄱㄷ |

Note: The bold, italic letters in clumns 5 and 6 are the last letters repeatedly typed as markers.

FIG 13

METHOD FOR SPECIFICALLY CONVERTING NON-PHONETIC CHARACTERS REPRESENTING VOCABULARY IN LANGUAGES INTO SURROGATE WORDS FOR INPUTTING INTO A COMPUTER

It is a regular patent application of the provisional patent applications, application number 60/008,509 filed Dec. 12, 1995, 60/008,646 filed Dec. 14, 1995, a provisional patent application filed Apr. 16, 1996, a provisional patent application filed Oct. 23, 1996, and a latest provisional patent application filed Oct. 26, 1996.

BACKGROUND OF THE PRESENT INVENTION

The present invention relates to written non-phonetic characters of oriental languages, such as Chinese, Japanese, Korean language, Indian language, and etc., and more particularly to a conversion method of creating new surrogate words to precisely represent such non-phonetic characters used in written oriental languages, in which the surrogate words are words created with either English-style or native alphabets in the present invention to represent non-phonetic characters used in the Chinese, Japanese and Korean languages. Therefore, the non-phonetic characters can be easily inputted into in a computer through an English-style or native alphabetic keyboard, a mouse or other phonetic inputting method. Moreover, such new surrogate words can be stored in a computer and precisely transmitted by E-mail (Electronic Mail).

Non-phonetic characters of Chinese languages were derived from pictures by the ancient Chinese to express themselves thousands of years ago. These characters have gone through many changes over their long history, from pictures of the subjects they described in the ancient times to the uniformly square shapes of today. The Koreans and the Japanese adopted and incorporated the Chinese characters into their languages, although they do not necessarily pronounce or use all the characters the same way as the Chinese do. The majority of the characters used by these two peoples have the same or similar meaning as they do in the Chinese language. Nowadays, most of the characters are consisted of two parts, i.e. one denotes the meaning, usually referred to as the pictogram when this part resembles something, or referred to as the ideogram when this part bears some of the meaning of the character. The other denotes the pronunciation, usually referred to as phonetic radical. In Chinese language, the pronunciation of a character is monosyllabic, meaning one sound for each character.

The ideogram is a symbol that can be either a character or part of a character, which denotes the meaning of that character by inference. Pure ideograms are rare. However they can be found in many characters that do not have phonetic radicals but instead, have two or more pictograms combined to infer a meaning that can be understood by the readers. The pronunciation of this kind of characters must be memorized, since there are no phonetic radicals present in this kind of characters. When the ideogram is used as a radical of a character, it is silent. The following are some examples of the ideogram.

(1) 明 is made of the sun, 日 and the moon, 月 therefore it means bright. (2) 艶 is consisted of abundant, 豊 and color, 色 therefore it means strikingly beautiful. (3) 好 is the combination of a son, 子 and daughter, 女 hence it means good. (4) 細 is made of combination of silk, 糸 and small squares of rice field, 糸 therefore it means tiny and fine. (5) 林 is made of two trees, 木 therefore it means woods.

The pictogram is a symbol that is either a character or part of a character, which is the approximate likeness of an object the character described. The pictograms are more common than the ideograms since the Chinese characters evolved from pictures. When the pictogram is used as a part of a character, it is silent. For example, 鳥 for birds, 馬 for horse, and 木 for wood or tree.

A pictogram not only bears the meaning of the character of which it is a part, but also expresses the meaning by showing the physical likeness of the object the character described. This affords the character to be easily recognized and understood.

The radical is a part of a character. There are usually two kinds of radicals in a character. One denotes the meaning and the other denotes the pronunciation of the character. The former is known as a pictogram or ideogram depending on its shape or what it stands for. If the shape resembles an object, it is called pictogram. If it does not resemble anything but has a meaning derived from other uses, or from inference, it is called ideogram. They remain silent when the character is pronounced. Another kind of radical is known as a phonetic radical that bears the actual or approximate pronunciation of the character, hence it is sounded.

Sometimes, a character can be used as a radical, such as (1) 家 in 嫁 稼 (2) 票 in 飄, 漂, 嫖. This kind of radicals are mostly used as phonetic radicals. Very often, a radical can be used as a character, such as 疾, 籍, 輯, 績, 急, 及, 木.

Another unique feature in colloquial Chinese language is that it allows four ways to pronounce a given phonetic, i.e. four intonations. The total combinations of pronunciations and intonations in Chinese language are about 1,544. This compares to about 13,200 commonly used characters. Theoretically speaking, each pronunciation/intonation combination represents about 8 to 9 characters. In reality, a lot of pronunciation/intonation combinations are not adequately used or not used at all. Furthermore, the Chinese people seem to over-use some of the combinations, such as ji, qi and xi. Such uneven usage causes certain combinations to represent more than 50 characters. The applicant calls this phenomenon over representation, a problem that renders oriental languages (including Chinese, Japanese, Korean, and Indian languages) very difficult to be computerized in their original forms.

For example, there are 99 Chinese characters, such as 飄, 漂, 嫖, 起, 革, 給, 擊, 圾, 基, 擊, 圾, 基, 榴, 積, 箕, 肌, 饑, 跡, 激, 雞, 姬, 績, 急, 及, 疾, 籍, 輯, 棘, etc., having the same pronunciation/intonation combination of ji. There are 69 Chinese characters, such as 榴, 緝, 期, 欺, 棲, 戚, 妻, 七, 柒, 沏, 其, 棋, 奇, 歧, 畦, 崎, 臍, 齊, 旗, 祈, 祁, 騎, 起, 豈, 乞, 企, etc., having the same pronunciation/intonation combination of qi. There are 67 Chinese characters, such as 係, 繫, 臘, 棲, 昔, 熙, 析, 西, 矽, 晰, 嘻, 吸, 錫, 稀, 息, 希, 硒, etc., having the same pronunciation/intonation combination of xi.

Currently, the oriental languages, such as Chinese, Japanese, Korean language, and Indian language, use thousands of characters which is in contract to the English language's 26 alphabets, therefore the computerization of such oriental languages is a substantial problem. Obviously, it is absolutely impractical to have a typewriter keyboard consisting of thousands of keys. Thus, the input of the oriental characters into the computers or word processors becomes an extremely hard task.

Generally speaking, there are two major systems of computer inputting method for the oriental languages, i.e. the "shape" system and the "phonetic" system. The "shape" system, such as the "CHANGJEI" or "DA YI" input system for Chinese, designates a plurality of shape symbols according to the shapes of the radicals of the characters, in which each combination of the shape symbols represents an unique characters. The drawback of the "shape" system is really difficult to learn and use. The users have to study the specific way of how to divide each character into predetermined shape symbols and learn by heart thousands of shape symbols representing different characters. Although the shape system enables the user to precisely input the specific character into the computer or word processor, only a tiny portion of skilled people such as the professional typists who received special, and intensive training can utilize such "shape" system. Ordinary people are unable to input even one character by utilizing the "shape" system. Besides, the learning process of the "shape" system is so complicated that most business people are unable to spend so much time to learn by heart all the input codes of the "shape" system. In other words, the "shape" system is designed for those people whose career are computer data typists only. Furthermore, the "shape" system inputs and stores each character by 2 bites. However, during electronic transmission, such as E-mail, the transmitting unit is single byte only, so that any information or data inputted by the "shape" system is unable to E-mail through Internet. In other words, those oriental people whose written language is not a phonetic one such as English have little or no chance to enjoy the convenience of E-mail and Internet.

The "phonetic" system, such as the "PIN YIN" or "ZHUYIN" input system for Chinese, as shown in FIG. 1, enables the user to input the pronunciation of the character by typing the corresponding Latin-style alphabets adopted to represent consonants and vowels in Chinese or zhuyin zimu into the computer, therefore most people can utilize these methods without any training. Basically, pin yin is the Chinese pronunciation for spelling. Here the term implies "spelling with Latin-style alphabets". The pin yin system generally refers to the Draft Plan of Chinese Language Phonetic Spelling announced by the Committee for Chinese Characters Reform in February of 1956. These alphabets are listed alongside the zhuyin zinu in FIG. 1. The zhuyin zimu comprises thirty-six Chinese characters, with very few strokes each, which were chosen to represent consonants and vowels in Chinese language by the Chinese Ministry of Education in the spring of 1913. Zhuyin zimu is still commonly used in Taiwan for the purpose of teaching the pronunciation of the Chinese characters. In mainland China, however, the pin yin system has replaced zhuyin zimu. Please refer to FIGS. 1 and 4.

As mentioned above, for oriental languages, it is very common that a plurality of different characters have the same pronunciation. In other words, one single set of pin yin or zhuyin zimu codes may represent a plurality of different characters. Therefore, after a set of pin yin or zhuyin zimu codes is keyed-in, either the "PIN YIN" or the "ZHUYIN ZIMU" system will provide numerous characters for the user to select the exact character therefrom. For example, the pin yin of "及" is "ji". Therefore, if the user would like to key-in a character "及" which means "and", the user can key-in the alphabets j and i. However, there are approximately 99 Chinese characters, such as 給,擊,圾,基,機,蹟,畸,稽,積,箕,肌,饑,跡,激,繼,姬,繼,急,飄,漂,嫖,及,瘵,籍,齏赍, etc., sharing the indentical pronunciation/intonation combination of ji. The user needs to further search for the precise character "及" from the 99 homonymous characters appeared on the computer screen. Obviously, both the "PIN YIN" and "ZHUYIN" systems are too cumbersome and impractical. Moreover, for the reason mentioned above, neither the "PIN YIN" system nor the "ZHUYIN" system is adapted for transmission through E-mail.

Nowadays, the most efficient and commonly used tool for information transmission is the E-mail. Large quantity of data and information can be transmitted all over the world instantly. People can transmit or achieve unlimited information and knowledge instantly through the E-mail. However, those countries and people using oriental languages still can not discover any input method which is adapted to be E-mail. This unsolved situation may deeply resist the cultural and commercial development between the Asia and the Western societies.

Moreover, having been around for thousands of years, the Chinese culture produced huge numbers of idioms and proverbs that are quoted daily by hundreds of millions of people throughout East Asia and other places where Chinese, Japanese and Korean languages are taught or used. It will be a boon to the computer users who routinely process one of these languages to have a fast yet accurate means to input these frequently quoted phrases and sentences into the computers.

Those existing methods to input commonly used phrases and sentences written in Chinese or Kanji characters consists the following steps:

(1) Alphabetizing the Chinese or Kanji characters according to their pronunciation in the respective language, and (2) Typing the first alphabet of the spelling of each Chinese or Kanji character of the phrase to form an acronym on the keyboard of a computer which is equipped with a software that can interpret the acronyms and display the correspondent Chinese characters.

This method works fine when the pronunciation of a phrase is unique, but in real life, there are large number of phrases, especially the ones containing less than four characters, having identical pronunciation (homonymous). To compensate this problem of large number of homonyms, the software engineers design their program to display the phrases in Chinese characters, at the bottom of the screen for the typist to select the one he or she desires. If the desired phrase or sentence is not there, the typist can hit the down arrow key to invoke the next phrase or sentence until the desired one is found. This searching or selection process makes the existing method cumbersome, time consuming and, sometimes frustrating.

SUMMARY OF THE PRESENT INVENTION

The main object of the present invention is to provide a method for specifically converting non-phonetic characters representing vocabulary in languages into surrogate words for inputting into a computer. Such newly created surrogate words are unique for and can precisely represent the non-phonetic characters used in the written oriental languages such as Chinese, Japanese, Korean language, and Indian language, thus facilitating the easy input of the information in these languages into a computer.

Another object of the present invention is to provide a method for specifically converting non-phonetic characters representing vocabulary in languages into surrogate words for inputting into a computer, in which such newly created surrogate words are adapted to be transmitted through E-mail without losing any information.

Another object of the present invention is to provide a method for specifically converting non-phonetic characters representing vocabulary in languages into surrogate words for inputting into a computer, which paves the way for incorporating the voice recognizing and generating technology into computers processing information in the oriental languages.

Another object of the present invention is to provide a method for specifically converting non-phonetic characters representing vocabulary in languages into surrogate words for inputting into a computer. Such method enables both the Western and Eastern people to input oriental languages easily and precisely without any complicated learning process.

Another object of the present invention is to provide a method for specifically converting non-phonetic characters representing vocabulary in languages into surrogate words for inputting into a computer, in which such method can also be utilized to teach speaking, reading and writing of a language whose written form is non-phonetic by using the theories and logic of the present invention.

Another object of the present invention is to provide a method for specifically converting non-phonetic characters representing vocabulary in languages into surrogate words for inputting into a computer, which facilitates the input of the phrases and sentences into the computer.

Accordingly, a method for specifically converting non-phonetic characters representing vocabulary in languages into surrogate words for inputting into a computer comprises the steps of:

(a) alphabetizing a pictographic/ideographic radical of each character according to its pronunciation in a respective language, with the resulting spelling then being used as a prefix for a newly created surrogate word;

(b) alphabetizing the character according to its pronunciation in the respective language, with the resulting spelling then being used as a spelled suffix for the newly created surrogate word; and (c) combining the prefix and suffix together and separate them with a separating mark such as a hyphen "-", thus creating the surrogate word for the specific "character" used in the written form of the respective language.

With respect to the Chinese language which has intonations, for the new surrogate words in Chinese, the intonations of the pronunciation of the prefixes and suffixes are indicated with selected consonants as indicators.

For pictograms/ideograms with the same pronunciation and intonation, the last letter of the spelling for the specific pictogram/ideogram is repeated either once, twice or thrice, the repeated letters being treated just as extra letters for distinguishing the radicals they represent and have no bearing on the pronunciation of the radicals.

When the new surrogate words are pronounced, the prefixes are to be treated like the pictograms or ideograms that they represent silent. Just as the phonetic radicals they represent, the suffixes are sounded. If the pronunciation of a Chinese prefix is unique, the indicator for its intonation is exempted. Since the suffixes are sounded, the demand for accuracy dictates that the indicator for the intonations should be present at all times with suffixes except when the intonation is the first one of four.

BRIEF DESCRIPTION OF THE DRAWINGS

FIG. 1 is a chart for illustrating the Pin Yin alphabets and Zhuyin Zimu.

FIG. 2 is a chart for illustrating the Katakana, Hiragana and their English Equivalent.

FIG. 3 is a chart for illustrating the Hangul and their English Equivalent.

FIGS. 4A to 4K are a continuous chart for illustrating the 214 p/i radicals of Chinese language and the spelled surrogate prefix for each p/i radical, in which various systems of surrogate prefix can be obtained by Literary pronunciation, Habitual pronunciation, simplified special key(s) (both pinyin alphabets and zhuyin zimu) for computer input, and some simplified optional key for computer input.

FIG. 5 is a chart for illustrating a plurality of Chinese characters having the identical pronunciation of ji, wherein each character is precisely represented by a unique surrogate word achieved by the three steps of the conversion method of the present invention.

FIG. 6 is a chart for illustrating the five steps used to convert the Chinese characters into surrogate words in English-style alphabets and Zhuyin Zimu according to the present invention.

FIG. 7 is a chart for illustrating the five steps used to convert the Japanese characters into surrogate words in English-style alphabets, Katakana and Hiragana according to the present invention.

FIG. 8 is a chart for illustrating the five steps used to convert the Korean characters into surrogate words in English-style alphabets and Hangul according to the present invention.

FIG. 9 is a chart for illustrating the changes made to the alphabets used in the Pin Yin system according to the present invention.

FIG. 10 is a chart for illustrating the steps used to convert the Chinese phrases into surrogate phrases in English-style alphabets according to the present invention.

FIG. 11 is a chart for illustrating the steps used to convert the Chinese phrases into surrogate phrases in Zhuyin Zimu according to the present invention.

FIG. 12 is a chart for illustrating the steps used to convert the phrases of the Chinese characters used by the Japanese phrases into surrogate phrases in English-style alphabets, Hiragan and Katakana according to the present invention.

FIG. 13 is a chart for illustrating the steps used to convert the phrases of Chinese characters used by the Korean phrases into surrogate phrases in English-style alphabets and Hangul according to the present invention.

DETAILED DESCRIPTION OF THE PREFERRED EMBODIMENT

The Chinese, the written form of Japanese and Korean languages which are derived from the Chinese, and even the Indian languages are constituted by non-phonetic characters. The present invention provides a method to convert such non-phonetic characters into phonetic components by using existing or newly created phonetic symbols. The phonetic symbols are the visual signs to represent the phonetic components, consonants and vowels. They can be Latin-style or English-style alphabets and native alphabets such as Zhuyin Zimu, Katakana, Hiragana, Hangul, and etc. Phonetic symbols can also be created by designating a set of signs to represent consonants, vowels and intonations of any languages.

The purpose of the conversion method of the present invention is to enable the computerization of these languages. The phonetic symbols can be English-style alphabets, native alphabets such as Zhuyin Zimu, Katakana, Hiragana, Hangul or newly created signs or symbols. Each non-phonetic character is then converted to a unique and newly spelled "surrogate word" by the conversion process disclosed in the present invention. The newly spelled surrogate words can precisely represent the characters used in the respective language. Please refer to FIGS. 1, 2 and 3 for these phonetic symbols and FIGS. 6, 7 and 8 for the spelled surrogate words constituted of these phonetic symbols. These three charts, as shown in FIGS. 6, 7 and 8, can be seen as a summary of this conversion process.

Generally speaking, each non-phonetic character, such as each typical Chinese character, is constituted by a pictographic or ideographic radical (reciting as "p/i radical" in the following description) denoting the meaning of the character and a phonetic radical denoting the pronunciation or the approximate pronunciation of the character. There are only 214 p/i radicals. Practically, the 214 p/i radicals can be coded precisely by 214 different sets of codes to represent the corresponding p/i radicals respectively. Referring to FIG. 4, in fact, each p/i radical has a specific pronunciation, for example, the Chinese character "疾, 籍, 輨" pronouncing xi and "支" pronouncing zhi. In other words, surrogate words "xi" and "zhi" precisely represent the p/i radicals "疾, 籍, 輨" and "支" respectively.

To assign thousands of sets of codes as surrogate words to precisely represent all the non-phonetic characters of an oriental language, for example Chinese, is more than possible. However, as the "shape" input system (such as the "CHANGJEI" or "DA YI" input system for Chinese mentioned in the background of the present invention) did, it is nearly impossible for a common and non-career user to memorize thousands of unfamiliar codes. In fact, before a human being learns how to write, he or she learns how to speak, i.e. how to pronounce the characters in a sentence. Hence, the pronunciation-derived alphabetization is one of the most familiar and logical ways to form a character. English utilizes different combinations of the 26 alphabets to constitute all the words in that language. Most Chinese characters also provide the phonetic radicals as their major constituting components.

No matter the Chinese, Japanese or Korean language, homonym is a common phenomenon in pronouncing characters and radicals. When two or more characters or radicals share identical pronunciation, or identical combination of pronunciation and intonation, they are said to be homonyms.

According to the present invention, a character is broken into two radicals. Then the radicals are alphabetized into prefix and suffix to form a surrogate word representing a given character. However, as disclosed in the background of the present invention, there are many non-phonetic characters are homonyms which share the identical pronunciation. The present invention provides a conversion method of creating new surrogate words to precisely represent such non-phonetic characters used in written oriental language respectively. Such conversion method can entirely solve such problems of homonyms, so that the non-phonetic characters can be easily inputted into in a computer through an ordinary alphabetic keyboard, a mouse or other phonetic inputting method by keying in sequentially the corresponding created surrogate words for the characters.

For Chinese language, the most common phonetic systems of pronunciation for spelling is Pinyin, Zhuyin Zimu, and Yueyin. Pinyin is the Chinese pronunciation for spelling. Here the term implies "spelling with Latin-style alphabets." Zhuyin comprises thirty-six Chinese characters, with very few stokes each. They were chosen to represent consonants and vowels in Chinese language, as shown in FIG. 1. Yueyin is the use of Pinyin for the Cantonese dialect.

For Japanese language, the most common phonetic system of pronunciation for spelling is Hiragana and Katakana, as shown in FIG. 2, in which Hiragana, which is treated as if it is plural in the present invention, is a group of special Chinese characters adopted by the Japanese as consonants and vowels to denote the pronunciation of vocabularies of Japanese origin. Hiragana resemble script Chinese characters. They are also a form of Japanese alphabets. Katakana, which is treated as if it is plural in the present invention, are a group of special Chinese characters adopted by the Japanese as consonants and vowels to denote the pronunciation of the Chinese characters and vocabularies of foreign origin. Katakana resemble the shapes of the printed characters. In reality, Katakana are also Japanese alphabets.

For Korean language, as shown in FIG. 3, Hangul are symbols representing the consonants and vowels of the Korean language. They are, in fact, referred to as alphabets by the Korean people.

The conversion method for specifically converting non-phonetic characters representing vocabulary in languages into surrogate words for inputting into a computer of the present invention comprises the steps as follows.

Step one. Alphabetize a pictographic/ideographic radical of each character according to its pronunciation in a respective language, with the resulting spelling then being used as a prefix for a newly created surrogate word.

For example, if English-style alphabets is used, the following examples illustrate how to phoneticalize the p/i radicals of the characters by spelling according to their pronunciation respectively in Chinese, Japanese and Korean.

A. Chinese language: 1. mu for 木  2. ma for 馬  3. niao for 鳥  4. shui for 水  5. xin for 心.

B. Japanese language: 1. ki for 木  2. uma for 馬  3. tori for 鳥  4. sui or mizu for 水  5. sakana or uo for 魚.

C. Korean language: 1. mool or soo for 水  2. nahmooh or muk for 木  3. kim for 金  4. soon or soo for 牙

It is worth to mention again that, of course, the p/i radicals can be represented in many ways. One way is to assign a unique number to each p/i radical. The total 214 numbers for the 214 p/i radicals can then be used instead of the spelling. Another way is to use a combination of keys on a computer key board to represent the numbers assigned to the radicals. For an example, by pressing one or two or all three of Ctrl, Alt, and Shift, then press any one of the alphanumeric keys, we can easily have 214 key combinations to represent all 214 p/i radicals. But the applicant thinks that the phonetic representation is the most user-friendly of all methods because the majority of these radicals can be easily pronounced and spelled. It requires little or no effort to memorize numbers or keys.

Step two. Alphabetize a phonetic radical of each character according to its pronunciation in the respective language, or alphabetize a pronunciation of a character if this character does not have a phonetic radical or when the phonetic radical does not bear the actual pronunciation of its character. The resulting spelling is then used as a suffix for the newly created surrogate word.

For example, if English-style alphabets is used, the following examples illustrate how to phoneticalize the phonetic radicals of the characters by spelling according to their pronunciation respectively in Chinese, Japanese and Korean.

A. Chinese language: 1. ya for 牙 and 甲 as in 鴉 and 鴨, in which 牙 is the phonetic radical of the character 鴉 and 鴉 pronounces 牙 (i.e. ya). Also 甲 is the phonetic radical of the character 鴨, and 鴨, pronounces 甲 (i.e. ya). 2. mei for 美, 每, 眉, and 未 as in 妹. 3. qi for 奇 as in 騎.

B. Japanese language: 1. ken for 檢 as in 檢驗, and 員 as in 消 and 賬. 2. tsuru for 鶴 and 蔓. 3. kai for 皆 as in 楷, 圭 as in 鮭, 貴 as in 潰.

C. Korean language: 1. kang for 巷 as in 港, 工 as in 江, 亢 as in 抗, and 岡 as in 鋼. 2. to for 兆 as in 桃 and 淘 as in 淘.

Step three. Combine the prefix and suffix together and separate the prefix and the suffix with a separating mark, such as a hyphen "-" or a space, thus creating a newly spelled surrogate word for each specific "character" used in the written form of the respective language.

For example:

A. Chinese language:

1. mu-mei for 梅 which p/i radical is 木 pronouncing mu and phonetic radical is 每 pronouncing mei (the character 梅 also pronouncing mei).

2. niao-ya for 鴉 which p/i radical is 鳥 pronouncing niao and phonetic radical is 牙 pronouncing ya (the character 鴉 also pronouncing ya).

3. ma-qi for 騎 which p/i radical is 馬 pronouncing ma and phonetic radical is 奇 pronouncing qi (the character 騎 also pronouncing qi).

B. Japanese language: 1. ki-ken for 檢 2. uma-ken for 驗. 3. sui-ken for 消 4. tori-ken for 賬 5. kusa-tsuru for 蔓. 6. tori-tsuru for 鶴 7. ki-kai for 楷 8. sakana-kai for 鮭 9. sui-kai for 潰.

C. Korean language: 1. mool-kang for 江 2. soo-kang for 抗. 3. kim-kang for 鋼 4. nahmooh-to for 桃 6. mool-to for 淘

By processing the above step one to step three, a unique and newly spelled surrogate word is created to precisely represent a specific character. The surrogate word generally comprises a prefix and a suffix combining by a separating mark, in which the prefix is the spelling of the pronunciation of the p/i radical of the character and the suffix is the spelling of the pronunciation of the phonetic radical of the character or the pronunciation of the character. When the user is spelling the surrogate word, it just likes the user is speaking the character. In other words, Chinese, Japanese or Korean people can simply and easily distinguish which surrogate word created by the above steps of the present invention is standing for which character, as if they are writing that character.

However, when the inputting specific character is a p/i radical itself, such as 衣, 一, 言, 人, 土, 大, 口, 女, 力 etc., the user can immediately achieve the above precise character after inputung the prefix (the spelling for the p/i radical) and the separating mark only and does not need to key in the suffix. In some case, even the separate mark can also be omitted.

In view of Chinese language, although the surrogate words do not look like the written Chinese character, it is 100% derived from Chinese character. According to the above three steps of the conversion process of the present invention, approximately 95% of the Chinese characters are precisely represented by a corresponding unique surrogate word respectively. In other words, when the user inputs a surrogate word created with the above three steps into a computer or word processor, a specific Chinese character can be precisely obtained. Therefore, this conversion method highly increases the inputting accuracy and speed of inputting Chinese characters. Furthermore, since the surrogate words are constituted of alphabets and can precisely represent the respective characters, the surrogate words enable the non-phonetic characters, i.e. the Chinese, Japanese and Korean languages, to be sent through E-mail without any confusion and loss of any information.

Generally, a number of Chinese characters have an identical pronunciation, for example the pronunciation yi has about 99 homonymous characters. It is the major problem making the non-phonetic characters difficult or even impossible to be computerized. As shown in FIG. 5, a list of Chinese homonym characters is illustrated, wherein all the characters pronounce ji. In accordance with the present invention, the spelling of the pronunciation ji of each homonymous character as shown in FIG. 5 is converted to be a suffix of a surrogate word. Since the non-phonetic characters have a common feature that there is no identical character, i.e. each character has a different appearance, this feature becomes an important distinct factor of the non-phonetic characters. Practically, even two characters have an identical pronunciation, they have different p/i radicals or even differently written phonetic radicals. In other words, even though they may have the same p/i radicals and are pronounced identically, they definitely have different shapes, so that they will not be misunderstood by a reader. By this point, one would probably has gathered that the non-phonetic characters are visually based. The trick to sort homonyms in a visually based written language is by making them look different from one another. Therefore, according to the present invention, the spelling of the pronunciation or an assigned alphabetic or number code of the p/i radical of each homonymous character is used as a prefix of the surrogate word. Combining the prefix and the suffix with a separating mark constitutes a whole spelled surrogate word uniquely representing that character. As shown in FIG. 5, each homonymous character has a corresponding, unique spelled surrogate word, therefore by inputting those surrogate words into the computer or word processor, a specific character can be obtained.

Basically, by proceeding the above three steps of the conversion method of the present invention, nearly all of but 5% of the Chinese and 10 to 15% of Japanese and Korean characters can be precisely inputted into a computer by typing the corresponding, unique surrogate words for the characters. Of course, the user may simply selects the desired character from the display on the screen of the computer since the large number of homonym characters is reduced to several characters only. The present invention already greatly shortens the selection time and reduces work. The present invention further provides two additional steps to the above three basic steps for creating unique surrogate words which can 100% precisely represent the remaining homonymous characters. In other words, by processing the total five steps of the present invention, there will be no chance of any two characters having an identical surrogate word.

With respect to the Chinese language which has intonations, for the new surrogate words in Chinese, the intonations of the pronunciation of the prefixes and suffixes are denoted with selected consonants as indicators.

Therefore, a first additional step is processed before the step three as described above. In the first additional step, for the newly spelled surrogate words for Chinese characters, intonations of the pronunciation of the prefixes and suffixes are to be indicated with consonants placed at the end of the spelling. The first intonation bears no indicator. The second intonation is denoted by the second Chinese consonant "p" for pinyin alphabet and "ㄆ" for zhuyin zimu. The third intonation is denoted by a third consonant "m" for pinyin alphabet and "ㄇ" for zhuyin zimu The fourth intonation is denoted by a fourth consonant "f" for pinyin alphabet and "ㄈ" for zhuyin zimu.

For examples:

In Chinese language: 1. shi for 尸. 2. ship for 十. 3. shim for 矢. 4. shif for 示.

Therefore, for example, for the Chinese character 湄 its unique surrogate word is shui-mei. In which its phi radical is 水 pronouncing shui and phonetic radical is 眉 pronouncing mei (the character 湄 also pronouncing mei).

It is important to note that in the official colloquial Chinese language, Mandarin dialect, the consonants never appear behind the vowels except for n or r according to the rules set forth in the Pinyin system. Therefore it is easy for a reader or typist to recognize these three ending consonants p, m, f, as indicators of the intonations. It must be noted again that this first additional step does not apply to the Japanese and Korean languages as these languages do not have intonations in their colloquial form. Basically, by processing the above four steps, approximately 98% of the Chinese characters can be precisely represented by their corresponding specific surrogate words respectively.

Since the Chinese language has quite a few pictograms or ideograms with the same pronunciation and intonation, there are some extreme examples as shown in FIG. 6, in which four homonymous Chinese characters having the identical pronunciation of shi are illustrated. A second additional step is processed after step three. In the second additional step, a marker is added after the last letter of the surrogate word to represent the next homonymous pictogram or ideogram that appears secondly in the Index of Pictograms/Ideograms in a Chinese dictionary. The marker can be any key on the keyboard. However, for the sake of efficiency and accuracy, this marker should be the last letter of the spelling. In other words, the repetition of the last letter of the spelling distinguishes homonymous pictograms or ideograms. For the homonymous pictogram or ideogram that appears secondly in the Index (choose bar) on the screen of the computer or in the standard dictionary, it will be repeated once, twice for the one that appears thirdly, thrice for the one that appears fourthly in the Index (choose bar) on the screen of the computer or in the standard dictionary. However, we can used the numerals 1, 2, 3, 4, 5, . . . or "home keys": a, s, d, f, g, h, j, k, l, and etc. or any other predetermined symbols as the markers. Home keys are the keys provided on the keyboard of the computer where the typist's fingers generally rest thereon for representing the numerals 1 to 10.

For example:

A. Chinese language: 1y for ━━━▲ 2. yy for 乙 3. yyy for 弋 4. yyyy for 絲 OR

"1" for ━━━▲ 2. "2" for 乙 3. "3" for 弋 4. "4" for 絲 OR

"a" for ━━━▲ 2. "s" for 乙 3. "d" for 弋 4. "f" for 衣

B. Japanese language: 1. ki for 木 2. kii for 黄

C. Korean language: 1. sin for 城 2. sinn for 身 3. sinnn for 辛 4. sinnnn for 辰

The repeated letters shall be treated just as extra letters, or markers, for distinguishing the homonymous radicals and they shall not have any beaning in the pronunciation of the radical. The same procedure mentioned above will be applied to the homonymous characters having the identical prefix, according to the order they appear in the dictionaries.

Example as shown in FIGS. 6 to 8:

A. Chinese language (as shown in FIG. 6): 1. yan-shif for 試 2. yan-shiff for 誓 3. yan-shifff for 言是 4. yan-shiffff for 識 OR 1. yan-shi1 for 試 2. yan-shi2 for 誓 3. yan-shi3 for 言是 4. yan-shi4 for 識 OR (1. yan-shia for 試 2. yan-shis for 誓 3. yan-shid for 言是 4. yan-shif for 識)

B. Japanese language (as shown in FIG. 7): 1. ki-ko for 杠 2. k-koo for 杞 3. ki-kooo for 杭 4. ki-koooo for 枯

C. Korean language (as shown in FIG. 8): 1. muk-ki for 杞 2. muk-kii for 杭 3. muk-kiii for 枯 4. muk-kiiii for 機

When the new surrogate words are pronounced, the prefixes are to be treated like the pictograms or ideograms that they represent silent. Just as the phonetic radicals they represent, the suffixes are sounded. If the pronunciation of a Chinese prefix is unique, the indicator for its intonation is exempted. Since the suffixes are sounded, the demand for accuracy dictates that the indicator for the intonations to be present at all times with suffixes except when the intonation is the first one of the four.

Please refer to FIGS. 6 to 8, which summarize the entire conversion process for four extreme exemplary characters which can illustrate all five steps regarding to the present invention. FIG. 6 illustrates four Chinese characters as example. FIG. 7 illustrates four Japanese characters as example. FIG. 8 illustrates four Korean characters as example. Those charts in FIGS. 6 to 8 share the same format that each has five columns and at least eight rows. Starting from the left, Column 1 contains the five steps of the conversion process or description of the columns to the right. The four columns to the right contains the four characters mentioned in the above examples, one in each column, and the transformation they go through row by row. Row 1 is occupied by the four characters in their original forms with pronunciation marked by English-style alphabets. Row 2 houses the radicals derived from each character. Row 3 shows the spelling for each and every radical. This row actually details the effects of steps one and two. Row 4 illustrates the effect of step three, which applies only to the Chinese language. Row 5 shows how step four influences the characters, with explanation in column two. Row 6 demonstrates how step five completes the conversion process with comments in each column invoking rule number two. Row 7 exhibits the final products of the process by themselves without any description. By doing so, it allows the readers to clearly see the uniqueness of the newly spelled surrogate words or codes for the characters which share the identical prefix, pronunciation and intonation. Row 8 unveils the surrogate words experimentally spelled with native alphabets. There is an extra row in FIG. 7, because the Japanese people have 2 sets of native alphabets, i.e. Katakana and Hiragana. Row 8 is occupied by codes made of Katakana. Codes made of Hiragana are put in row 9. There is also an extra row in FIG. 8 too. The applicant just wants to use that extra row to spell codes in Hangul organized in a straight horizontal line like English. At the bottom of each chart, a rule which is described below is listed for reminding purpose.

In accordance with the present invention, the conversion method further has two rules for pronouncing the invented surrogate words.

1. When it comes to pronouncing the invented, spelled surrogate words, the prefixes are to be silent (like the pictograms or ideograms they represent). Just as the phonetic radicals they stand for, the suffices are sounded.

2. If the pronunciation of a prefix is unique, the indicator for its intonation can be omitted. Since the suffices are sounded, the demand for accuracy dictates that the indicator for their intonation to be present at all times except when the intonation is the first one of the four.

As described in the above step three of the present invention, the surrogate words are organized in such a manner: the prefix comes in first, then the separating mark (the separating mark can be a hyphen as in Latin alphabets, however the hyphen can be replaced by other symbols such as * if native alphabets are used to spell the surrogate words), then the suffix. However, the step one and the step three as described above can be reversed, that is, the suffix proceeds the prefix. Therefore, the surrogate word will be organized "suffix-prefix". Such alternative mode will also work as long as the computer is told this is the situation. For example, the unique surrogate word of the specific Chinese character 績 is "ji-xi" according to this second embodiment (in the first embodiment, the surrogate word 績 is "xi-ji"). Since both the surrogate words created from the first embodiment and the second embodiment consist of the same alphabets, both of them can be used to precisely represent the same character. Besides, the user may preprogram the computer with a "switching key", so that the user can feel free to switch the computer to accommodate the first and the second embodiment anytime.

In fact, the second embodiment may be better in certain cases. When a particular user feels that the pictographic/ideographic radical is hard to pronounce, hence difficult to type. Instead of looking from the dictionary for the pronunciation of a rare and difficult radical, the user can just go ahead to type the suffix. The computer can display homonymous characters for the user to choose. This can be done, for example, by typing just a hyphen or * in case of native alphabet, first, then the suffix. If the user suddenly remembers the spelling of the prefix, i.e. the spelling of the pronunciation of the p/i radical, he can type a hyphen (or *, if native alphabets are used) then the prefix. He can still get precisely the character he desires, since this reversed combination is just as unique as the "normal" combination described in step four of the first embodiment. Otherwise, homonymous characters will be displayed for the user to select the desired character. Instead of numeralizing the homonyms, alphabets of the "home keys" can be used to indicate the order of the homonyms. The user can choose the desired character by typing in a key, such as: "a" for the first, "s" for the second, "d" for the third. This is just a matter of the software design.

Moreover, the combination of these five steps, including the reversed combination described above, and the two rules not only enables the Chinese, Japanese, Korean, and even East Indians to use computers likes Americans, but also makes voice recognizing/generating technology readily available to them. A voice recognizing computer can be built using a sound card and a software as in usual manner to train it to understand a person's pronunciation of each word in such a manner that first the prefix, then the indicator if applies, then the separating mark (hyphen), then the suffix, then the marker(s) if applicable. Of course, the reversed combination described above can also be used for this purpose as long as the hyphen or * is pronounced first, then the suffix, then the hyphen or *, then the prefix.

The conversion method disclosed in the present invention can enable those people who can speak but cannot write the respective non-phonetic language to input the characters into a computer and print out an essay written in that language. Another remarkable function of the present invention is that by utilizing a voice generating computer, with the same sound card and a software that can pronounce the suffices accurately, the computer can read out a document for the user to edit and print, so that the users need not spend time and energy to check the document character by character for possible typing errors. This function can also help those people who can speak but cannot write or read the respective non-phonetic language to check their document which is inputted into the computer through the conversion method of the present invention.

The following are some notes that the applicant would like to further disclose.

The English-style alphabets used to create the surrogate words to precisely represent the characters in written Chinese language are the ones used in the official Pinyin system in China, with some niinor changes. These changes are intended to eliminate some exceptions in the Pinyin system, making it easier to use. Please referring to FIG. 1 for the entire set of Pinyin alphabets and FIG. 9 for the said changes. If Zhuyin Zimu is used to spell the newly invented surrogate words, the prefixes and the suffixes should be separated by an asterisk instead of a hyphen.

The alphabets used to create the surrogate words to precisely represent the characters in written Japanese are the ones proposed in Hepburn system of romanization commonly accepted by the Japanese to phonetically translate the Japanese language into English-style alphabets. If the new surrogate words are spelled with Katakana or Hiragana, the hyphen should be replaced by an asterisk also.

The alphabets used to create the surrogate words to precisely represent the characters used in the written Korean language are the ones commonly accepted by the Koreans to phonetically translate the Korean language into English-style alphabets. Also, an asterisk is used instead of a hyphen when the native alphabet is employed to spell a surrogate word for a character used in Korean language.

To distinguish the surrogate words invented for these languages from English, the non English spellings can be italicized as is the case in this application.

The order of the Chinese consonants are as follows according to the Pinyin system:

B, P, M, F, D, T, L, N, G, K, H, J, Q, X, ZH, CH, SH, R, Z, C, S.

It is possible to abbreviate the prefixes after the mass gets very familiar with them. In its abbreviated form, the consonant, the first alphabet or the last alphabet of a prefix should be adequate to represent most of the prefixes. With voice recognition technology, the abbreviation may not be necessary.

In this description, the examples of the phonetically spelled surrogate words with native alphabets for the Chinese, Japanese and Korean languages are illustrations of the concept of the present invention. The actual spellings for the same characters with the native alphabets or English-style alphabets may differ from the ones used in this description. Furthermore, one can always create any kinds of signs to replace the existing phonetic symbols. But to effectively create uniquely new surrogate words to precisely represent the characters, one has to use the five steps and the two rules disclosed in the present invention.

The newly spelled surrogate words, whether made of English-style or the native alphabets, resemble the characters in the way both kinds are consisted of radicals, pictographic or ideographic ones and phonetic ones. These surrogate words differ from the characters in at least two ways. First, the radicals for the newly spelled surrogate words are phoneticalized, while the radicals in the characters, especially the pictographic/ideographic radicals are not. Second, the invented and spelled surrogate words are more uniform in construction that the pictographic/ideographic radicals always occupy the left portion of the surrogate words as prefixes, and the phonetic radicals always occupy the right portion of the surrogate words as suffixes. While the pictographic/ideographic radicals in the characters can occupy the left, right, top or bottom portion of the characters. The aforesaid resemblance makes the new surrogate words more familiar to the users while the differences make the new surrogate words logical and more scientific from the stand point of phonology. As a result, it is fairly easy to learn these surrogate words. Practically, the user can simply type the surrogate word which represents a specific non-phonetic character through the key board so as to precisely key-in the specific non-phonetic character into the computer.

Referring to FIGS. 10 to 13, by means of the surrogate words, it renders a set of multi-syllabic vocabularies, a phrase or a sentence of written Chinese or Kanji characters used in Chinese, Japanese and Korean languages to be keyed-in through a simplified method utilizing a surrogate phrase or sentence which is a unique set of codes (USC).

The unique set of codes (USC) is a group of alphabets constitute of acronyms, labels and makers for precisely representing a phrase or sentence, in which the acronym refers to the abbreviation of the suffixes of a plurality of surrogate words representing a plurality of Chinese characters in a given phrase or sentence and the label refers to the abbreviation of the prefixes of a plurality of surrogate words representing a plurality of Chinese characters in the above given phrase or sentence. Besides, the marker is the repetition or repetitions of the last alphabet of the acronym or label.

The unique surrogate phrase or sentence constituted of a plurality of non-phonetic characters can be achieved by the following steps:

(a) alphabetizing each non-phonetic character of the phrase according to a pronunciation of the non-phonetic character to form a spelled prefix for a surrogate word of the non-phonetic character; and (b) selecting a first or a last alphabet from each prefix of each non-phonetic character of the phrase and grouping the selected alphabets of each prefix of each non-phonetic character of the phrase to form an acronym of the surrogate phrase.

Generally, the non-phonetic character is pronounced with a pronunciation of a phonetic radical of the non-phonetic character. For most Chinese phrases or sentences which have more than four characters, the specific phrase or sentence may be achieved by merely keying-in the acronym, which is obtained by the above two steps, of the surrogate phrase or sentence into the computer. If there are still a few homonymous phrases or sentences occurred, an additional step of repeating the last alphabet of the acronym as a marker can be processed.

For phrases or sentences with four Chinese characters or more, simply repetition of the last alphabet of the acronym as the marker can be adequate to separate the homonymous acronyms from one another since the homonymous acronyms of longer phrases or sentences are less common than those of the phrases consisting less than four characters.

For those phrases with less than four Chinese characters, additional steps as follows must be processed:

(c) alphabetizing a pictographic/ideographic radical of each non-phonetic character of the phrase according to a pronunciation of the pictographic/ideographic radical of the non phonetic character or an abbreviation of the pronunciation of the pictographic/ideographic radical to form a spelled suffix of the non-phonetic character;

(d) grouping a first or a last alphabet of the suffix of each non-phonetic character to form a label of the surrogate phrase; and (e) combining the acronym and the label together to form the unique surrogate phrase, as shown in the column 6 of FIGS. 10 to 13.

By inputting the surrogate phrase into the computer, generally the precise phrase or sentence in characters can be achieved. However, in order to prevent misunderstanding of the acronym and the label of the surrogate phrase, the acronym can be keyed in upper case letters and the label can be keyed in lower case letters if the acronym and label are pronounced by English-style alphabets according to the Pinyin system. Of course, one can also key-in the acronym in lower case letters and the label in upper case letters.

If such surrogate phrase is still unable to produce a unique set of codes to represent the specific phrase or sentence, the following step can be processed until a unique set of codes (USC) is created:

(f) repeating the last alphabet of the label as a marker.

Basically, the acronym and the label can also be pronounced by Zhuyin Zimu, Hiragana, Katagana or Hangul. In accordance with the present embodiment, the acronym is keyed-in before the label. It is also possible to put the label in front of the acronym, then repeat the last alphabet of the acronym as a marker.

Alternatively, the above step (e) can be substituted by the step (e') of putting each alphabet of the label ahead of each alphabet of the acronym, or the step (e") of putting each alphabet of acronym ahead of each alphabet of the label. For example, if we have an acronym "ABCDE" and a label "stuvw" instead of forming a surrogate phrase as "ABCDEstuvw" or "STUVWabcde" as mentioned above, the alternative surrogate phrase can be created in this manner: "SaTbUcVdWe" or "AsBtCuDvEw".

With a software based on this invention, all commonly used phrases in Chinese, Japanese and Korean languages can be produced precisely on the screen just a English words are processed now. For newly created popular phrases or sentences, the typist can create the new unique surrogate phrases for them respectively. Moreover, using a conventional voice recognizing software which helps the computer to understand the pronunciation of the alphabets, the surrogate phrases can be input orally. After the computer is informed that phrase input will begin, the user can then start reading the unique set of codes (surrogate phrase), including cases of the letters, to input the phrases. The computer can then convert the voice into Chinese characters.

It is worth to mention that there are other modified methods to create orders of acronyms mentioned above. These can be based on any letter of the prefixes or suffixes of any character of the phrases or sentences. Here are some examples:

1. In the native alphabetical order of:

A. The first letter of prefix of the first Chinese character of the phrase or sentence; or B. The last letter of the prefix of the first Chinese character of the phrase or sentence; or C. The first letter of the prefix of the last Chinese character of the phrase or sentence; or D. The last letter of the prefix of the last Chinese character of the phrase or sentence; or E. The last letter of the suffix of the first Chinese character of the phrase or sentence; or F. The last letter of the suffix of the last Chinese character of the phrase of sentence.

2. English alphabetical order for all of the above and the acronyms mentioned above can be used as well when Latin-style alphabets are used to create USC's.

3. The order can be based on the number of strokes of one of the radicals contained in any character or the number of strokes of any character of the phrase or sentence, for examples, number of strokes of the following can be used for this purpose:

A. The first Chinese or Kanji character of the phrase or sentence: or

B. The last Chinese of character of the phrase or sentence; or

C. The pictographic/ideographic radical of the first character of the phrase or sentence; or D. The pictographic/ideographic radical of the last character of the phrase or sentence; or E. The phonetic radical of the first Chinese character of the phrase or sentence; or F. The phonetic radical of the last Chinese character of the phrase or sentence.

Besides, actually the label can be any letter of a prefix or suffix of any character of the phrase, for examples, one of the following can be used as a label:

A. The first letter of the prefix of the first character of the phrase or sentence;

B. The last letter of the prefix of the first character of the phrase or sentence;

C. The first letter of the suffix of the first character of the phrase or sentence;

D. The last letter of the suffix of the first character of the phrase or sentence;

E. The first letter of the prefix of the last character of the phrase or sentence;

F. The last letter of the prefix of the last character of the phrase or sentence;

G. The first letter of the suffix of the last character of the phrase or sentence;

H. The last letter of the suffix of the last character of the phrase of sentence.

Also, the label can be the number of strokes of any character or its one of its radicals in the phrase or sentence.

The preferable labels are made of the regular form of the first letter of the prefixes because it is flowing with the typist's train of thoughts. Also, the labels will always be in lower case lettering, while the acronyms themselves are always in Upper case lettering. This arrangement can avoid confusion on the part of the human as well as the computer. Since the spelling of a character is always in lower case lettering, the "shift" key on the keyboard will serve as a signal to the computer that the user is going to input a phrase or sentence.

In fact, the theory of the surrogate phrase can be applied to any language that is burdened by homonyms, such as certain dialects in Indian language.

These surrogate words and surrogate phrase (unique sets of codes (USC)) can be used to send documents consisting Chinese characters through E-mail via the Internet or other similar media, as long as the receiving party has a copy of the same software installed that can interpret the surrogate words and USC's. In fact, the documents generated without the benefit of the surrogate words and USC's are not quite compatible with the Internet protocol since the characters require two bytes to represent each and every one of them while Internet recognizes only one byte (actually seven bits) at a time. That is due to the extraordinarily large number of Chinese characters, one byte is not adequate to represent all of them, since the largest number of byte can represent is 256, which is large enough to cover all of the English alphabets, punctuation marks and numbers. To accommodate thousands of the Chinese characters, two bytes are required to make up a number which will have more than four digits. This conflict puts this kind of documents at odds with the Internet protocol. A document with this incompatibility can get "scrambled" beyond recognition after going through the Internet. However, if the contents of these documents are sent through E-mail in the form of the surrogate words or surrogate phrases (USC), they will arrive their destination intact, because the Internet protocol will treat the surrogate words and phrases as English which is totally compatible with Internet.

What is claimed is:

1. A method for converting non-phonetic characters into surrogate words for inputting into a computer, comprising the steps of:

(a) assigning a unique code to represent a pictographic/ideographic radical of a non-phonetic character of a language, wherein said unique code being used as a prefix for a surrogate word;

(b) alphabetizing said non-phonetic character of said respective language according to a pronunciation of said non-phonetic character to form a spelled suffix for said surrogate word; and (c) combining said prefix and said suffix together and separating said prefix and said suffix with a separating mark to constitute said surrogate word representing said non-phonetic character of said respective language.

2. A method for converting non-phonetic characters into surrogate words for inputting into a computer, as recited in claim 1, wherein, in step (a), said unique code of said prefix of said surrogate word is a numeral code.

3. A method for converting non-phonetic characters into surrogate words for inputting into a computer, as recited in claim 1, wherein, in step (a), said unique code of said prefix of said surrogate word comprises a combination of keys provided on a key board of said computer to represent said unique code assigned to said pictographic/ideographic radical.

4. A method for converting non-phonetic characters into surrogate words for inputting into a computer, as recited in claim 1, wherein, in step (a), said unique code of said prefix of said surrogate word is an alphabetic spelling of a pronunciation of said pictographic/ideographic radical.

5. A method for converting non-phonetic characters into surrogate words for inputting into a computer, as recited in claim 1, wherein, in step (a), said unique code of said prefix of said surrogate word is an abbreviated form of an alphabetic spelling of a pronunciation of said pictographic/ideographic radical.

6. A method for converting non-phonetic characters into surrogate words for inputting into a computer, as recited in claim 5, wherein said abbreviated form of said prefix of said surrogate word is a consonant of said pronunciation of said pictographic/ideographic radical.

7. A method for converting non-phonetic characters into surrogate words for inputting into a computer, as recited in claim 5, wherein said abbreviated form of said prefix of said surrogate word is a first alphabet of said alphabetic spelling of said pronunciation of said pictographic/ideographic radical.

8. A method for converting non-phonetic characters into surrogate words for inputting into a computer, as recited in claim 5, wherein said abbreviated form of said prefix of said surrogate word is a last alphabet of said alphabetic spelling of said pronunciation of said pictographic/ideographic radical.

9. A method for converting non-phonetic characters into surrogate words for inputting into a computer, as recited in claim 1, wherein, in step (b), said character of said respective language is alphabetized by pronouncing a phonetic radical of said character to form said suffix of said surrogate word.

10. A method for converting non-phonetic characters into surrogate words for inputting into a computer, as recited in claim 4, 5 or 9, wherein said pictographic/ideographic radical and said phonetic radical are alphabetized by pronouncing with Latin alphabets.

11. A method for converting non-phonetic characters into surrogate words for inputting into a computer, as recited in claim 4, 5 or 9, wherein said pictographic/ideographic radical and said phonetic radical are alphabetized by pronouncing with English-style alphabets according to a Pinyin system.

12. A method for converting non-phonetic characters into surrogate words for inputting into a computer, as recited in claim 4, 5 or 9, wherein said pictographic/ideographic radical and said phonetic radical are alphabetized by pronouncing with native alphabets.

13. A method for converting non-phonetic characters into surrogate words for inputting into a computer, as recited in claim 12, wherein said pictographic/ideographic radical and said phonetic radical are alphabetized by pronouncing with zhuyin zimu according to a Chinese Zhuyin system.

14. A method for converting non-phonetic characters into surrogate words for inputting into a computer, as recited in claim 12, wherein said pictographic/ideographic radical and said phonetic radical are alphabetized by pronouncing according to a Japanese Hiragana system.

15. A method for converting non-phonetic characters into surrogate words for inputting into a computer, as recited in claim 12, wherein said pictographic/ideographic radical and said phonetic radical are alphabetized by pronouncing according to a Japanese Katagana system.

16. A method for converting non-phonetic characters into surrogate words for inputting into a computer, as recited in claim 12, wherein said pictographic/ideographic radical and said phonetic radical are alphabetized by pronouncing according to a Korean Hangul system.

17. A method for converting non-phonetic characters into surrogate words for inputting into a computer, as recited in claim 1, wherein, in step (c), said separating mark is a hyphen mark.

18. A method for converting non-phonetic characters into surrogate words for inputting into a computer, as recited in claim 1, wherein, in step (c), said separating mark is a space mark.

19. A method for converting non-phonetic characters into surrogate words for inputting into a computer, as recited in claim 1, wherein, in step (c), said separating mark is a asterisk mark.

20. A method for converting non-phonetic characters into surrogate words for inputting into a computer, as recited in claim 1, before said step (c), further comprising a first additional step of indicating an intonation of said suffix with a predetermined consonant as an indicator placed at the end of said spelling of said suffix.

21. A method for converting non-phonetic characters into surrogate words for inputting into a computer, as recited in claim 4, 5 or 9, before said step (c), further comprising a first additional step of indicating an intonation of said prefix and said suffix respectively with a predetermined consonant as an indicator placed at the end of said spelling of said prefix and said suffix.

22. A method for converting non-phonetic characters into surrogate words for inputting into a computer, as recited in claim 21, wherein a first intonation of said prefix and said suffix bear no indicator, a second intonation of said prefix and said suffix being denoted by a second consonant, a third intonation of said prefix and said suffix being denoted by a third consonant, a fourth intonation of said prefix and said suffix being denoted by a fourth consonant.

23. A method for converting non-phonetic characters into surrogate words for inputting into a computer, as recited in claim 22, wherein said second intonation of said prefix and said suffix is denoted by a "p" as said second consonant, said third intonation of said prefix and said suffix being denoted by a "m" as said third consonant, and said fourth intonation of said prefix and said suffix being denoted by a "f" as said fourth consonant.

24. A method for converting non-phonetic characters into surrogate words for inputting into a computer, as recited in claim 22, wherein said second intonation of said prefix and said suffix is denoted by a "ㄆ" as said second consonant, said third intonation of said prefix and said suffix being denoted by a "ㄇ" as said third consonant, and said fourth intonation of said prefix and said suffix being denoted by a "ㄈ" as said fourth consonant.

25. A method for converting non-phonetic characters into surrogate words for inputting into a computer, as recited in claim 1, after said step (c), further comprising an additional step of adding at least a marker after a last letter of said spelled surrogate word for distinguishing homonymous characters.

26. A method for converting non-phonetic characters into surrogate words for inputting into a computer, as recited in claim 25, wherein said marker is a repeated letter of said last letter of said spelled surrogate word.

27. A method for converting non-phonetic characters into surrogate words for inputting into a computer, as recited in claim 20, after said step (c), further comprising a second additional step of adding at least a marker after a last letter of said spelled surrogate word for distinguishing homonymous characters.

28. A method for converting non-phonetic characters into surrogate words for inputting into a computer, as recited in claim 27, wherein said marker is a repeated letter of said last letter of said spelled surrogate word.

29. A method for converting non-phonetic characters into surrogate words for inputting into a computer, as recited in claim 21, after said step (c), further comprising a second additional step of adding at least a marker after a last letter of said spelled surrogate word to distinguish homonymous characters.

30. A method for converting non-phonetic characters into surrogate words for inputting into a computer, as recited in claim 29, wherein said marker is a repeated letter of said last letter of said spelled of surrogate word.

31. A method for converting non-phonetic characters into surrogate words for inputting into a computer, as recited in claim 22, after said step (c), further comprising a second addition step of adding at least a marker after a last letter of said spelled surrogate word to distinguish homonymous characters.

32. A method for converting non-phonetic characters into surrogate words for inputting into a computer, as recited in claim 31, wherein said marker is a repeated letter of said last letter of said spelled of surrogate word.

33. A method for converting non-phonetic characters into surrogate words for inputting into a computer, comprising the steps of:
   (a) alphabetizing a non-phonetic character of a language according to a pronunciation of said non-phonetic character to form a spelled prefix of a surrogate word;
   (b) assigning a unique code to represent a pictographic/ideographic radical of said non-phonetic character of said respective language, wherein said unique code being used as a suffix for said surrogate word; and
   (c) combining said prefix and said suffix together and separating said prefix and said suffix with a separating mark to constitute said surrogate word representing said character of said respective language.

34. A method for converting non-phonetic characters into surrogate words for inputting into a computer, as recited in claim 33, wherein, in step (b), said unique code of said suffix of said surrogate word is a numeral code.

35. A method for converting non-phonetic characters into surrogate words for inputting into a computer, as recited in claim 33, wherein, in step (b), said unique code of said suffix of said surrogate word comprises a combination of keys provided on a key board of said computer to represent said unique code assigned to said pictographic/ideographic radical.

36. A method for converting non-phonetic characters into surrogate words for inputting into a computer, as recited in claim 33, wherein, in step (b), said unique code of said suffix of said surrogate word is an alphabetic spelling of a pronunciation of said pictographic/ideographic radical.

37. A method for converting non-phonetic characters into surrogate words for inputting into a computer, as recited in claim 33, wherein, in step (b), said unique code of said suffix of said surrogate word is an abbreviated form of an alphabetic spelling of a pronunciation of said pictographic/ideographic radical.

38. A method for converting non-phonetic characters into surrogate words for inputting into a computer, as recited in claim 37, wherein said abbreviated form of said suffix of said surrogate word is a consonant of said alphabetic spelling of said pronunciation of said pictographic/ideographic radical.

39. A method for converting non-phonetic characters into surrogate words for inputting into a computer, as recited in claim 37, wherein said abbreviated form of said suffix of said surrogate word is a first alphabet of said alphabetic spelling of said pronunciation of said pictographic/ideographic radical.

40. A method for converting non-phonetic characters into surrogate words for inputting into a computer, as recited in claim 37, wherein said abbreviated form of said suffix of said surrogate word is a last alphabet of said alphabetic spelling of said pronunciation of said pictographic/ideographic radical.

41. A method for converting non-phonetic characters into surrogate words for inputting into a computer, as recited in claim 33, wherein, in step (a), said character of said respective language is alphabetized by pronouncing a phonetic radical of said character to form said prefix of said surrogate word.

42. A method for converting non-phonetic characters into surrogate words for inputting into a computer, as recited in claim 36, 37 or 41, wherein said pictographic/ideographic radical and said phonetic radical are alphabetized by pronouncing with Latin alphabets.

43. A method for converting non-phonetic characters into surrogate words for inputting into a computer, as recited in claim 36, 37 or 41, wherein said pictographic/ideographic radical and said phonetic radical are alphabetized by pronouncing with English-style alphabets according to a Pinyin system.

44. A method for converting non-phonetic characters into surrogate words for inputting into a computer, as recited in claim 36, 37 or 41, wherein said pictographic/ideographic radical and said phonetic radical are alphabetized by pronouncing with native alphabets.

45. A method for converting non-phonetic characters into surrogate words for inputting into a computer, as recited in claim 44, wherein said pictographic/ideographic radical and said phonetic radical are alphabetized by pronouncing with zhuyin zimu according to a Chinese Zhuyin system.

46. A method for converting non-phonetic characters into surrogate words for inputting into a computer, as recited in claim 44, wherein said pictographic/ideographic radical and said phonetic radical are alphabetized by pronouncing according to a Japanese Hiragana system.

47. A method for converting non-phonetic characters into surrogate words for inputting into a computer, as recited in claim 44, wherein said pictographic/ideographic radical and said phonetic radical are alphabetized by pronouncing according to a Japanese Katagana system.

48. A method for converting non-phonetic characters into surrogate words for inputting into a computer, as recited in claim 44, wherein said pictographic/ideographic radical and said phonetic radical are alphabetized by pronouncing according to a Korean Hangui system.

49. A method for converting non-phonetic characters into surrogate words for inputting into a computer, as recited in claim 33, wherein, in step (c), said separating mark is a hyphen mark.

50. A method for converting non-phonetic characters into surrogate words for inputting into a computer, as recited in claim 33, wherein, in step (c), said separating mark is a space mark.

51. A method for converting non-phonetic characters into surrogate words for inputting into a computer, as recited in claim 33, wherein, in step (c), said separating mark is a asterisk mark.

52. A method for converting non-phonetic characters into surrogate words for inputting into a computer, as recited in claim 33, before said step (c), further comprising a first additional step of indicating an intonation of said suffix with a predetermined consonant as an indicator placed at the end said spelling of said suffix.

53. A method for converting non-phonetic characters into surrogate words for inputting into a computer, as recited in claim 36, 37 or 41, before said step (c), further comprising a first additional step of indicating an intonation of said prefix and said suffix respectively with a predetermined consonant as an indicator placed at the end of said spelling of said prefix and said suffix.

54. A method for converting non-phonetic characters into surrogate words for inputting into a computer, as recited in claim 53, wherein a first intonation of said prefix and said suffix bear no indicator, a second intonation of said prefix and said suffix being denoted by a second consonant, a third intonation of said prefix and said suffix being denoted by a third consonant, a fourth intonation of said prefix and said suffix being denoted by a fourth consonant.

55. A method for converting non-phonetic characters into surrogate words for inputting into a computer, as recited in claim 54, wherein said second intonation of said prefix and said suffix is denoted by a "p" as said second consonant, said third intonation of said prefix and said suffix being denoted by a "m" as said third consonant, and said fourth intonation of said prefix and said suffix being denoted by a "f" as said fourth consonant.

56. A method for converting non-phonetic characters into surrogate words for inputting into a computer, as recited in claim 54, wherein said second intonation of said prefix and said suffix is denoted by a "ㄆ" as said second consonant, said third intonation of said prefix and said suffix being denoted by a "ㄇ" as said third consonant, and said fourth intonation of said prefix and said suffix being denoted by a "ㄈ" as said fourth consonant.

57. A method for converting non-phonetic characters into surrogate words for inputting into a computer, as recited in claim 33, after said step (c), further comprising an additional step of adding at least a marker after a last letter of said spelled surrogate word for distinguishing homonymous characters.

58. A method for converting non-phonetic characters into surrogate words for inputting into a computer, as recited in claim 57, wherein said marker is a repeated letter of said last letter of said spelled surrogate word.

59. A method for converting non-phonetic characters into surrogate words for inputting into a computer, as recited in claim 52, after said step (c), further comprising a second additional step of adding at least a marker after a last letter of said spelled surrogate word for distinguishing homonymous characters.

60. A method for converting non-phonetic characters into surrogate words for inputting into a computer, as recited in claim 59, wherein said marker is a repeated letter of said last letter of said spelled surrogate word.

61. A method for converting non-phonetic characters into surrogate words for inputting into a computer, as recited in claim 53, after said step (c), further comprising a second addition step of adding at least a marker after a last letter of said spelled surrogate word to distinguish homonymous characters.

62. A method for converting non-phonetic characters into surrogate words for inputting into a computer, as recited in claim 61, wherein said marker is a repeated letter of said last letter of said spelled surrogate word.

63. A method for converting non-phonetic characters into surrogate words for inputting into a computer, as recited in claim 54, after said step (c), further comprising a second addition step of adding at least a marker after a last letter of said spelled surrogate word to distinguish homonymous characters.

64. A method for converting non-phonetic characters into surrogate words for inputting into a computer, as recited in claim 63, wherein said marker is a repeated letter of said last letter of said spelled surrogate word.

65. A method for converting a plurality of non-phonetic characters of a phrase of a language into a surrogate phrase for inputting into a computer, comprising the steps of:
(a) alphabetizing each said non-phonetic character of said phrase according to a pronunciation of said non-phonetic character to form a spelled prefix for a surrogate word of each said non-phonetic character;
(b) selecting a predetermined alphabet from each said prefix of each said non-phonetic character of said phrase and grouping said plurality of selected alphabets to form an acronym of said surrogate phrase;
(c) alphabetizing a pictographic/ideographic radical of each said non-phonetic character of said phrase according to a pronunciation of said pictographic/ideographic radical of each said non phonetic character to form a spelled suffix of each said non-phonetic character of said phrase;
(d) selecting a predetermined alphabet from each said suffix of each said non-phonetic character of said phrase and grouping said plurality of selected alphabets of said suffixes of said non-phonetic characters of said phrase to form a label of said surrogate phrase; and
(e) combining said acronym and said label together to form said surrogate phrase.

66. A method for converting a plurality of non-phonetic characters of a phrase of a language into a surrogate phrase for inputting into a computer, as recited in claim 65, wherein, in step (e), said acronym is placed in front of said label to form said surrogate phrase.

67. A method for converting a plurality of non-phonetic characters of a phrase of a language into a surrogate phrase for inputting into a computer, as recited in claim 66, wherein said acronym is in upper case lettering and said label is in lower case lettering when English-style alphabet is used.

68. A method for converting a plurality of non-phonetic characters of a phrase of a language into a surrogate phrase for inputting into a computer, as recited in claim 65, wherein, in step (e), said label is placed in front of said acronym to form said surrogate phrase.

69. A method for converting a plurality of non-phonetic characters of a phrase of a language into a surrogate phrase for inputting into a computer, as recited in claim 68, wherein said label is in upper case lettering and said acronym is in lower case lettering when English-style alphabet is used.

70. A method for converting a plurality of non-phonetic characters of a phrase of a language into a surrogate phrase for inputting into a computer, as recited in claim 65, wherein, in step (e), each said alphabet of said label is put ahead of each said alphabet of said acronym to form said surrogate phrase.

71. A method for converting a plurality of non-phonetic characters of a phrase of a language into a surrogate phrase for inputting into a computer, as recited in claim 70, wherein said alphabets of said label are in upper case lettering and said alphabets of said acronym are in lower case lettering when English-style alphabet is used.

72. A method for converting a plurality of non-phonetic characters of a phrase of a language into a surrogate phrase for inputting into a computer, as recited in claim 65, wherein, in step (e), each said alphabet of said acronym is put ahead of each said alphabet of said label to form said surrogate phrase.

73. A method for converting a plurality of non-phonetic characters of a phrase of a language into a surrogate phrase for inputting into a computer, as recited in claim 72, wherein said alphabets of said acronym are in upper case lettering and said alphabets of said label are in lower case lettering when English-style alphabet is used.

74. A method for converting a plurality of non-phonetic characters of a phrase of a language into a surrogate phrase for inputting into a computer, as recited in claim 65, wherein, in step (d), a first alphabet is selected from each said suffix of each said non-phonetic character of said phrase to form said label of said surrogate phrase.

75. A method for converting a plurality of non-phonetic characters of a phrase of a language into a surrogate phrase for inputting into a computer, as recited in claim 66, wherein, in step (d), a first alphabet is selected from each said suffix of each said non-phonetic character of said phrase to form said label of said surrogate phrase.

76. A method for converting a plurality of non-phonetic characters of a phrase of a language into a surrogate phrase for inputting into a computer, as recited in claim 68, wherein, in step (d), a first alphabet is selected from each said suffix of each said non-phonetic character of said phrase to form said label of said surrogate phrase.

77. A method for converting a plurality of non-phonetic characters of a phrase of a language into a surrogate phrase for inputting into a computer, as recited in claim 70, wherein, in step (d), a first alphabet is selected from each said suffix of each said non-phonetic character of said phrase to form said label of said surrogate phrase.

78. A method for converting a plurality of non-phonetic characters of a phrase of a language into a surrogate phrase for inputting into a computer, as recited in claim 72, wherein, in step (d), a first alphabet is selected from each said suffix of each said non-phonetic character of said phrase to form said label of said surrogate phrase.

79. A method for converting a plurality of non-phonetic characters of a phrase of a language into a surrogate phrase for inputting into a computer, as recited in claim 6, wherein, in step (d), a last alphabet is selected from each said suffix of each said non-phonetic character of said phrase to form said label of said surrogate phrase.

80. A method for converting a plurality of non-phonetic characters of a phrase of a language into a surrogate phrase for inputting into a computer, as recited in claim 66, wherein, in step (d), a last alphabet is selected from each said suffix of each said non-phonetic character of said phrase to form said label of said surrogate phrase.

81. A method for converting a plurality of non-phonetic characters of a phrase of a language into a surrogate phrase for inputting into a computer, as recited in claim 68, wherein, in step (d), a last alphabet is selected from each said suffix of each said non-phonetic character of said phrase to form said label of said surrogate phrase.

82. A method for converting a plurality of non-phonetic characters of a phrase of a language into a surrogate phrase for inputting into a computer, as recited in claim 70, wherein, in step (d), a last alphabet is selected from each said suffix of each said non-phonetic character of said phrase to form said label of said surrogate phrase.

83. A method for converting a plurality of non-phonetic characters of a phrase of a language into a surrogate phrase for inputting into a computer, as recited in claim 72, wherein, in step (d), a last alphabet is selected from each said suffix of each said non-phonetic character of said phrase to form said label of said surrogate phrase.

84. A method for converting a plurality of non-phonetic characters of a phrase of a language into a surrogate phrase for inputting into a computer, as recited in claim 65, after step (e), further comprising an additional step (f of repeating said last alphabet of said label as a marker.

85. A method for converting a plurality of non-phonetic characters of a phrase of a language into a surrogate phrase for inputting into a computer, as recited in claim 66, after step (e), further comprising an additional step (f) of repeating said last alphabet of said label as a marker.

86. A method for converting a plurality of non-phonetic characters of a phrase of a language into a surrogate phrase for inputting into a computer, as recited in claim 68, after step (e), further comprising an additional step (f) of repeating said last alphabet of said label as a marker.

87. A method for converting a plurality of non-phonetic characters of a phrase of a language into a surrogate phrase for inputting into a computer, as recited in claim 70, after step (e), further comprising an additional step (f) of repeating said last alphabet of said label as a marker.

88. A method for converting a plurality of non-phonetic characters of a phrase of a language into a surrogate phrase for inputting into a computer, as recited in claim 72, after step (e), further comprising an additional step (e of repeating said last alphabet of said label as a marker.

89. A method for converting a plurality of non-phonetic characters of a phrase of a language into a surrogate phrase for inputting into a computer, as recited in claim 74, after step (e), further comprising an additional step (e of repeating said last alphabet of said label as a marker.

90. A method for converting a plurality of non-phonetic characters of a phrase of a language into a surrogate phrase for inputting into a computer, as recited in claim 75, after step (e), further comprising an additional step (f) of repeating said last alphabet of said label as a marker.

91. A method for converting a plurality of non-phonetic characters of a phrase of a language into a surrogate phrase for inputting into a computer, as recited in claim 76, after step (e), further comprising an additional step (f) of repeating said last alphabet of said label as a marker.

92. A method for converting a plurality of non-phonetic characters of a phrase of a language into a surrogate phrase for inputting into a computer, as recited in claim 77, after step (e), further comprising an additional step (f of repeating said last alphabet of said label as a marker.

93. A method for converting a plurality of non-phonetic characters of a phrase of a language into a surrogate phrase for inputting into a computer, as recited in claim 78, after step (e), further comprising an additional step (e of repeating said last alphabet of said label as a marker.

94. A method for converting a plurality of non-phonetic characters of a phrase of a language into a surrogate phrase for inputting into a computer, as recited in claim 79, after step (e), further comprising an additional step (f) of repeating said last alphabet of said label as a marker.

95. A method for converting a plurality of non-phonetic characters of a phrase of a language into a surrogate phrase for inputting into a computer, as recited in claim 80, after step (e), further comprising an additional step (f) of repeating said last alphabet of said label as a marker.

96. A method for converting a plurality of non-phonetic characters of a phrase of a language into a surrogate phrase for inputting into a computer, as recited in claim 81, after step (e), further comprising an additional step (e of repeating said last alphabet of said label as a marker.

97. A method for converting a plurality of non-phonetic characters of a phrase of a language into a surrogate phrase for inputting into a computer, as recited in claim 82, after step (e), further comprising an additional step (e of repeating said last alphabet of said label as a marker.

98. A method for converting a plurality of non-phonetic characters of a phrase of a language into a surrogate phrase for inputting into a computer, as recited in claim 83, after step (e), further comprising an additional step (e of repeating said last alphabet of said label as a marker.

99. A method for converting a plurality of non-phonetic characters of a phrase of a language into a surrogate phrase for inputting into a computer, comprising the steps of:
   (a) alphabetizing each said non-phonetic character of said phrase according to a pronunciation of said non-phonetic character to form a spelled prefix for a surrogate word of each said non-phonetic character;

(b) selecting a predetermined alphabet from each said prefix of each said non-phonetic character of said phrase and grouping said plurality of selected alphabets to form an acronym of said surrogate phrase;

(c) alphabetizing an abbreviation of a pronunciation of a pictographic/ideographic radical of each said non-phonetic character of said phrase to form a spelled suffix of each said non-phonetic character of said phrase;

(d) selecting a predetermined alphabet from each said suffix of each said non-phonetic character of said phrase and grouping said plurality of selected alphabets of said suffixes of said non-phonetic characters of said phrase to form a label of said surrogate phrase; and (e) combining said acronym and said label together to form said surrogate phrase.

100. A method for converting a plurality of non-phonetic characters of a phrase of a language into a surrogate phrase for inputting into a computer, as recited in claim 99, wherein, in step (e), said acronym is placed in front of said label to form said surrogate phrase.

101. A method for converting a plurality of non-phonetic characters of a phrase of a language into a surrogate phrase for inputting into a computer, as recited in claim 100, wherein said acronym is in upper case lettering and said label is in lower case lettering when English-style alphabet is used.

102. A method for converting a plurality of non-phonetic characters of a phrase of a language into a surrogate phrase for inputting into a computer, as recited in claim 99, wherein, in step (e), said label is placed in front of said acronym to form said surrogate phrase.

103. A method for converting a plurality of non-phonetic characters of a phrase of a language into a surrogate phrase for inputting into a computer, as recited in claim 102, wherein said label is in upper case lettering and said acronym is in lower case lettering when English-style alphabet is used.

104. A method for converting a plurality of non-phonetic characters of a phrase of a language into a surrogate phrase for inputting into a computer, as recited in claim 99, wherein, in step (e), each said alphabet of said label is put ahead of each said alphabet of said acronym to form said surrogate phrase.

105. A method for converting a plurality of non-phonetic characters of a phrase of a language into a surrogate phrase for inputting into a computer, as recited in claim 104, wherein said alphabets of said label are in upper case lettering and said alphabets of said acronym are in lower case lettering when English-style alphabet is used.

106. A method for converting a plurality of non-phonetic characters of a phrase of a language into a surrogate phrase for inputting into a computer, as recited in claim 99, wherein, in step (e), each said alphabet of said acronym is put ahead of each said alphabet of said label to form said surrogate phrase.

107. A method for converting a plurality of non-phonetic characters of a phrase of a language into a surrogate phrase for inputting into a computer, as recited in claim 106, wherein said alphabets of said acronym are in upper case lettering and said alphabets of said label are in lower case lettering when English-style alphabet is used.

108. A method for converting a plurality of non-phonetic characters of a phrase of a language into a surrogate phrase for inputting into a computer, as recited in claim 99, after step (e), further comprising an additional step (f) of repeating said last alphabet of said label as a marker.

109. A method for converting a plurality of non-phonetic characters of a phrase of a language into a surrogate phrase for inputting into a computer, as recited in claim 100, after step (e), further comprising an additional step (f) of repeating said last alphabet of said label as a marker.

110. A method for converting a plurality of non-phonetic characters of a phrase of a language into a surrogate phrase for inputting into a computer, as recited in claim 102, after step (e), further comprising an additional step (f of repeating said last alphabet of said label as a marker.

111. A method for converting a plurality of non-phonetic characters of a phrase of a language into a surrogate phrase for inputting into a computer, as recited in claim 104, after step (e), further comprising an additional step (f) of repeating said last alphabet of said label as a marker.

112. A method for converting a plurality of non-phonetic characters of a phrase of a language into a surrogate phrase for inputting into a computer, as recited in claim 106, after step (e), further comprising an additional step (f) of repeating said last alphabet of said label as a marker.

* * * * *